United States Patent
Tam et al.

(10) Patent No.: US 8,326,698 B1
(45) Date of Patent: *Dec. 4, 2012

(54) LOCAL PRODUCT INFORMATION

(75) Inventors: Daniel Tam, Sunnyvale, CA (US);
Jonathan A. Gold, Palo Alto, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/106,682

(22) Filed: May 12, 2011

Related U.S. Application Data

(63) Continuation of application No. 11/536,597, filed on Sep. 28, 2006, now Pat. No. 7,945,484.

(51) Int. Cl.
*G06Q 30/00* (2012.01)

(52) U.S. Cl. ............... 705/26.41; 705/26.1; 705/26.4; 705/26.44; 705/26.61; 705/26.9

(58) Field of Classification Search ............... 705/26.1, 705/26.4, 26.41, 26.43, 26.44, 26.61, 26.9, 705/28, 500
See application file for complete search history.

(56) References Cited

U.S. PATENT DOCUMENTS

| | | | | |
|---|---|---|---|---|
| 5,712,989 | A | 1/1998 | Johnson et al. | 395/228 |
| 5,758,328 | A | 5/1998 | Giovannoli | 705/26 |
| 5,842,178 | A | 11/1998 | Giovannoli | 705/26 |
| 6,554,183 | B1 | 4/2003 | Sticha et al. | 235/379 |
| 6,823,389 | B1 | 11/2004 | Satomi et al. | 709/227 |
| 6,917,922 | B1 | 7/2005 | Bezos et al. | 705/27 |
| 6,917,941 | B2 | 7/2005 | Wight et al. | 707/10 |
| 7,236,983 | B1 | 6/2007 | Nabors et al. | 707/104.1 |
| 7,315,833 | B2 | 1/2008 | Schrenk | 705/26 |
| 7,596,513 | B2 | 9/2009 | Fargo | 705/26 |
| 7,752,209 | B2 | 7/2010 | Ramer et al. | 707/752 |
| 7,774,331 | B2 | 8/2010 | Barth et al. | 707/706 |
| 7,945,484 | B1 * | 5/2011 | Tam et al. | 705/26.41 |
| 8,160,929 | B1 * | 4/2012 | Park et al. | 705/26.1 |
| 2002/0032611 | A1 | 3/2002 | Khan | 705/26 |
| 2002/0065769 | A1 | 5/2002 | Irribarren et al. | 705/37 |
| 2002/0072983 | A1 | 6/2002 | Teller | 705/26 |
| 2003/0046173 | A1 | 3/2003 | Benjier et al. | 705/26 |
| 2003/0177076 | A1 | 9/2003 | Might et al. | 705/28 |
| 2004/0093233 | A1 | 5/2004 | Teller | 705/1 |
| 2004/0093257 | A1 | 5/2004 | Rogers et al. | 705/10 |
| 2004/0117294 | A1 | 6/2004 | Ferraro et al. | 705/37 |
| 2005/0097005 | A1 | 5/2005 | Fargo | 705/26 |
| 2006/0031123 | A1 | 2/2006 | Leggett et al. | 705/26 |
| 2006/0138219 | A1 | 6/2006 | Brzezniak et al. | 235/383 |
| 2007/0107008 | A1 | 5/2007 | Dybus | 725/9 |
| 2007/0244750 | A1 | 10/2007 | Grannan et al. | 705/14 |

FOREIGN PATENT DOCUMENTS

KR 2001-0096357 11/2001

OTHER PUBLICATIONS

Mack, A.M., "Going Local," Adweek, vol. 41, No. 28, pp. 38-39, Jul. 10, 2000.*  Canada Newswire "Call Genie and Yellow Pages Group plan launch of telephone based interactive voice access to the Yellow Pages(TM) directories" Jan. 5, 2005, 2 pages.
Evarts, "Web Shopping That Keeps Dollars Local" Christian Science Monitor, p. 20, Apr. 24, 2000, 2 pages.
Sheng, "The Impact of Internet-Based Technologies on the Procurement Strategy," The Second Conference on Electric Business, Taipei, Taiwan, Dec. 10-13, 2002, 7 pages.

* cited by examiner

*Primary Examiner* — Nicholas D Rosen
(74) *Attorney, Agent, or Firm* — Seed IP Law Group PLLC

(57) ABSTRACT

The present invention is directed to a method and system for providing information obtained from both online stores and offline stores and for offering more purchasing options to customers. A customer can specify a particular item with detailed aspects for an information search, along with location information to define a local geographic area. The gathered local price information is presented to the customer over a network connection. The customer can purchase the item from either online stores or offline stores over a network connection.

31 Claims, 15 Drawing Sheets

LOCAL PRODUCT INFORMATION

CROSS-REFERENCE TO RELATED APPLICATIONS

This application is a continuation of co-pending U.S. application Ser. No. 11/536,597, filed Sep. 28, 2006 and entitled "Local Product Information," which is hereby incorporated by reference in its entirety.

BACKGROUND

With the increased popularity of the Internet, network purchasing services, e.g., Web sites that enable users to make purchases online, have become increasingly accepted and popular. The advantages of purchasing from/through network purchasing services are numerous. For example, network purchasing services offer a wide selection of products to choose from, price comparisons for the cost conscious, and the convenience of shopping for an item from anywhere a customer may have access to a shopping service, rather than making a trip to a particular store. However, some aspects associated with purchasing goods and services (i.e., "items") from network purchasing services can deter a customer from purchasing items online. For example, shipping and handling costs of an item may be perceived as an extra cost to the customer, particularly if the item can be purchased locally at a similar price. A long delivery time may be perceived as an inconvenience to the customer if the customer wishes to have the item immediately. Further, a customer may want to physically inspect or compare items prior to purchase. In such cases, the customer may want to purchase the item from local stores after locating information regarding the item from various network purchasing services.

In some situations, information about an item (such as pricing availability, selection, etc.) needs to be obtained from many local stores that have not yet established any online presence, or have an online presence unfamiliar to a customer. In one aspect, the customer can obtain the information relating to items through advertising. However, most local stores reach potential clients via offline advertising techniques: printed advertisements in newspapers and magazines, direct mailings, television commercials, radio commercials, yellow pages advertisements, sponsorships, etc. Moreover, for the local stores (offline stores) that have not yet established any online presence, the information relating to items is distributed within a limited local geographic area, typically on a town, city or county level. In another aspect, customers can obtain the information relating to items available at the offline stores mainly via a traditional method, such as making a telephone call to the offline merchants, walking into the store of the offline merchants, or reading the traditional advertisements, which can be time consuming and costly.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect of the present invention, a computer system for searching for price information about an item in response to a user request is provided. The computer system comprises at least one database for storing information relating to online stores and offline stores, and a computing device in communication with the database. The computing device is configured to identify at least one store where the item is available based on information relating to a user request. The computing device is further configured to contact the identified store to gather information about the item if the identified store is an offline store or to obtain information about the item from the one or more database. The gathered information is presented to the user to select a desired store where the user wants to purchase the item. In addition, the computing device may determine a limited geographic area where the offline store is located based on location information.

In another aspect of the present invention, the computing device is configured to implement interactive voice recognition or employ an agent to gather information from the offline stores. The gathered information from each identified store is evaluated to determine the likelihood of selection of the identified store and the stores are displayed in order of the likelihood of selection. The computing device is configured to determine an alternative item if it determines that the item is not available.

According to yet another aspect of the present invention, a computer-accessible medium for providing a customer price information of an item available at local stores is provided. The computer-accessible medium includes a storage component, a service provider interface component, a local information component and an offline store interface component. The storage component is configured to store previous purchase history data, local store data and customer profile data. The local information component is configured to search the local store data or directory information in order to identify the local stores. The directory information may be obtained from directory service providers via the service provider interface component. The offline store interface component is configured to collect price information from the local stores and to provide the collected price information to the customer.

Finally, according to other aspects of the invention, a computer-implemented method for obtaining information from offline venders and a user interface for enabling a user to search local product information of a selected item are also provided.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to a method and system for searching for information about an item. More specifically, the present invention relates to a method and system for enabling a user to collect information about an item from a number of vendors not having online presence or otherwise not integrated with a specified networked purchasing service, generally referred to as an "offline store." The networked purchasing service may further facilitate communication with a selected offline store and/or the purchase of a selected item from the selected offline store.

The following detailed description describes exemplary embodiments of the invention. Although specific system configurations, screen displays, and flow diagrams are illustrated, it should be understood that the examples provided are not exhaustive and do not limit the present invention to the precise forms and embodiments disclosed. Persons skilled in the field of processing purchase transactions will recognize components and process steps described herein that may be interchangeable with other components or steps, or combinations of components or steps, and still achieve the benefits and advantages of the invention.

It should also be understood that the following description is presented largely in terms of logic operations that may be performed by conventional computer components. These computer components, which may be grouped at a single location or distributed over a wide area on a plurality of devices, generally include computer processors, memory storage devices, display devices, input devices, etc. In circumstances where the computer components are distributed, the computer components are accessible to each other via communication links.

In the following description, numerous specific details are set forth in order to provide a thorough understanding of the invention. However, it will be apparent to one skilled in the art that the invention may be practiced without some or all of these specific details. In other instances, well-known process steps have not been described in detail in order not to unnecessarily obscure the invention.

Figure 1:
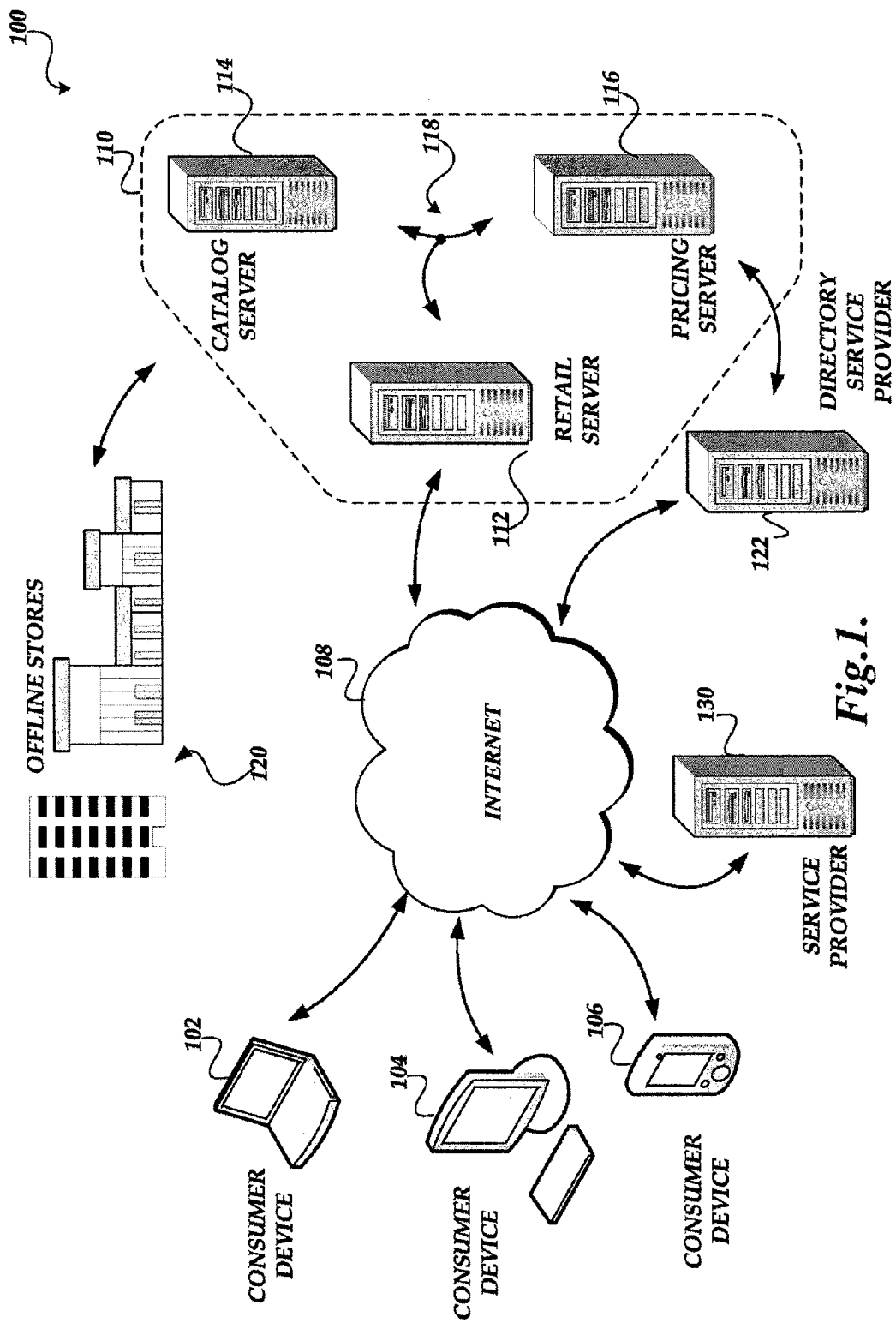
FIG. 1 is a pictorial diagram illustrating an exemplary networked environment suitable for providing price information from offline retailers to a customer in accordance with an embodiment of the present invention.

FIG. 1 illustrates an exemplary networked environment 100 suitable for providing the information regarding a selected item for a customer. Additionally, the exemplary networked environment 100 may facilitate a purchase transaction for a selected item. The exemplary networked environment 100 of FIG. 1 includes one or more customer devices, such as customer devices 102-106, by which a customer (not shown) can interact with a pricing information service 110.

The customer devices 102-106 communicate via a communication network, such as the Internet 108, with the pricing information service 110.

Customer devices, such as customer devices 102-106, are typically computing devices including a variety of configurations or forms such as, but not limited to, laptop or tablet computers, personal computers, personal digital assistants (PDAs), hybrid PDA/mobile phones, mobile phones, workstations, and the like. While illustrative embodiments have been illustrated and described, it will be appreciated that various changes can be made therein without departing from the spirit and scope of the invention.

The customer devices 102-106 are connected to a pricing information service 110 via a communication network, such as the Internet 108. As illustrated in FIG. 1, the service 110 may comprise one or multiple servers or discrete components to conduct a retail presence over the network. For example, as shown in FIG. 1, the illustrated service 110 is comprised of multiple components, including a retail server 112 that provides the "front end" to customers to access online stores and a catalog server 114 that provides general catalog information for items available for purchase from the online stores. The catalog server 114 may include information relating to online merchants. In one embodiment, most frequently used online merchant information may be obtained from the retail server and stored in the catalog server 114 for faster search on the online merchants and items available via the online merchants.

The illustrated service 110 further includes a pricing server 116 that searches information about items from various stores (e.g., online stores, offline stores, etc.). The pricing server 116 communicates with a directory service provider 122 or a third party service provider 130 that provides contact information or advertisement information of offline stores 120. For example, a directory listing of the local retail stores within a town or a city of the customer's residence may be provided from the directory service provider 122. The pricing server 116 also provides the "front end" to customers to obtain information relating to an item available from the offline stores 120.

Those skilled in the art will appreciate that the various servers/components depicted in FIG. 1 are illustrative only. As mentioned above, an actual embodiment of a pricing information service 110 may be comprised of a single computer or a plurality of discrete, cooperative servers distributed in a communications network. Similarly, the identified components should be viewed as logical components, as each component may be physically embodied on one or more computer systems, as well as combined with other hardware and/or software components not illustrated herein.

Figure 2:
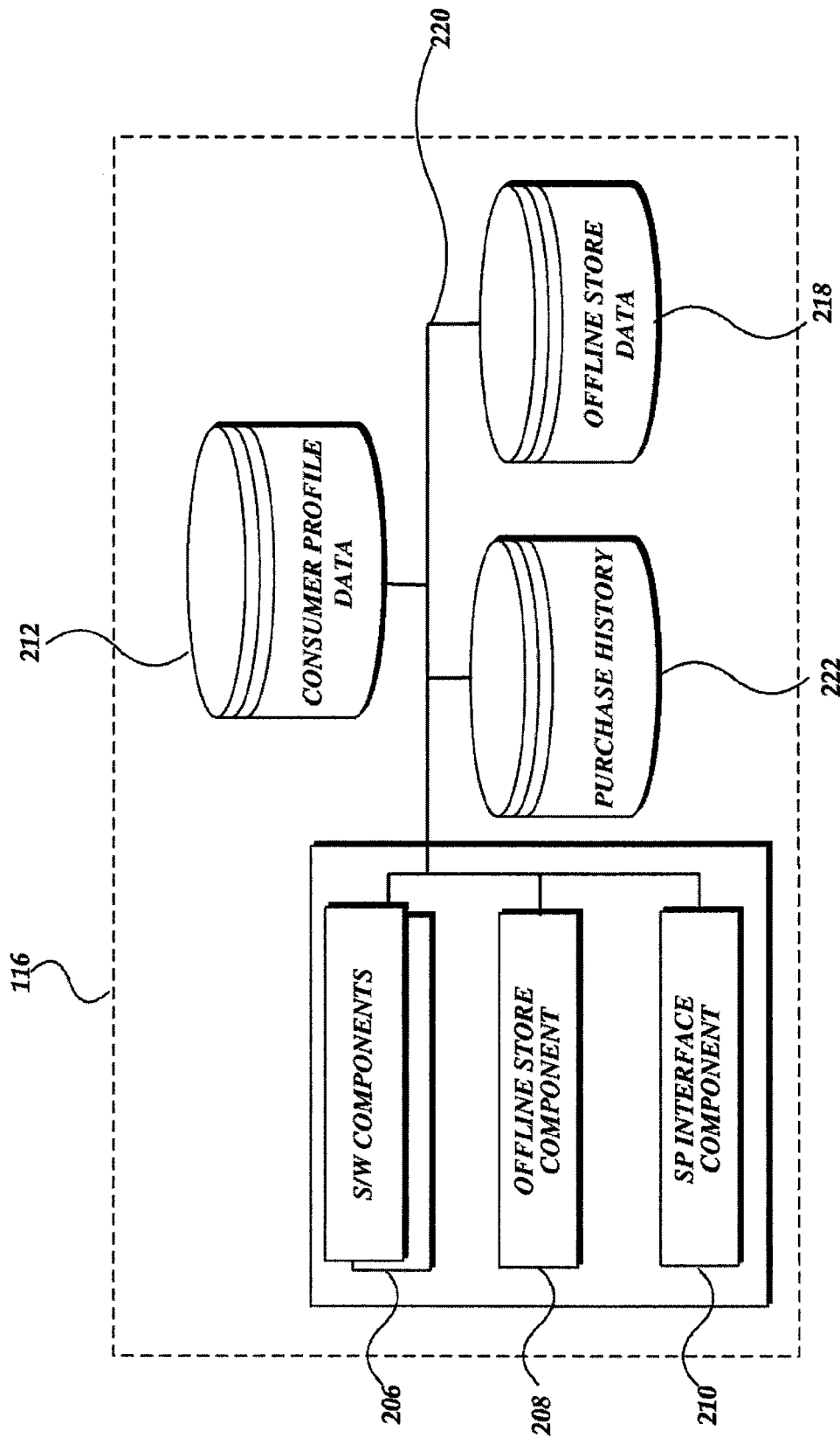
FIG. 2 is a block diagram illustrating exemplary components of an illustrative service provider suitable for providing price information of an item within the networked environment depicted in FIG. 1.

With regard to the pricing information service 110 providing price information of an item, FIG. 2 is a block diagram illustrating exemplary components of the pricing server 116 that are suitable for conducting a information search regarding a selected item over online or offline stores and suitable for enabling a customer to purchase the selected item from online or offline stores. More particularly, with regard to the pricing server 116, as shown, the server is implemented as a single integrated device although, as indicated above, this is illustrative only.

The exemplary server components also include, but are not limited to, software components 206, an offline store interface component 208, and a Service Provider (SP) interface component 210, as well as various databases comprising a customer profile database 212, a purchase history database 222, and an offline store database 218.

The software components 206 may include one or more programs or applications that constitute a virtual storefront, including functions (not shown) such as a front-end handling routine for processing requests from customer devices, catalog services, transaction processing modules, and the like.

The offline store interface component 208 obtains information about items selected by a customer for a purchase transaction. While shown as a component within the pricing server 116, the offline store interface component 208 may alternatively be implemented as an application that is included in the software components 206 and executed in conjunction with conducting a purchase transaction, a logical component of the service 110, or as a separate server 116 (as shown in FIG. 1) within the networked environment 100. Additionally, while the functionality of the offline store interface component 208 serves an important part of obtaining information about items, such as price information, it may be implemented differently in a variety of embodiments. To that end, the functionality of the offline store interface component 208 will be discussed in greater detail below.

Referring again to FIG. 2, the customer profile database 212 includes information regarding customer supplied preference information and/or additional information related to the identified customer. Other information may be stored in the customer profile database 212, including, but not limited to, customer supplied preferences, account information, wish lists, billing addresses and the like. The SP interface component 210 may communicate with third-party service providers 130 which provide a "front end" to a group of customers to access the pricing server 116 while providing their intended services. Further, the SP interface component 210 may obtain information about retail stores which are not integrated with the pricing information service 110 from third-party service providers 130.

The offline store database 218 may include information relating to retail stores that have not yet established any online presence. More specifically, the offline store database 218 may include information, such as contact information, available items, and promotions, relating to local retail stores that are located in a limited geographic area. In one embodiment, information stored in the offline store database 218 is organized in categories so that the offline store interface component 208 can easily identify offline stores based on information about a particular item.

It will be appreciated that the aforementioned examples are for illustrative purposes only and, thus, are not to be construed as limiting. Moreover, it will be appreciated that these aspects may be user configurable, fixed for a particular pricing server 116, or determined heuristically by the pricing server 116.

In one embodiment, the customer supplied preference information in the customer profile database 212 may include desirable aspects of an item with regard to how the offline store interface component 208 conducts a price information search. For example, when a customer indicates a desire to purchase a bouquet of flowers, the customer can specify a price range, types of flowers, color of flowers, how to gift wrap, a delivery method, etc. In yet another embodiment, the customer can define notification rules specifying several methods of notification and configuration information, including notification rules that may be stored in the customer profile database 212. For example, the customer may want to be notified when the item is shipped or the purchase transaction is cancelled. In this case, the customer may define configuration information to include a set of notification rules specifying an e-mail notification when the item is shipped while specifying a visual alert on a customer device when the purchase transaction is cancelled.

The purchase history database 222 may include, but is not limited to, store information, customer experience, price information, transaction records, and the like. The purchase history database 222 may further include records of a statistically significant number of previous purchases from a plurality of customers via the price information service 110. Moreover, the purchase history database 222 includes information representing an aspect of the customer's preference that may be applied to a current price search to determine which offline store has been accessed by customers to purchase an item. In one embodiment, a specific offline store may become part of the online stores where customers can conduct a purchase transaction with the pricing information service 110.

As will be described in greater detail below, the offline store interface component 208 may suggest an alternative to an item if the offline store interface component 208 cannot locate any online or offline stores where the item is available. The offline store interface component 208 may use the information in the purchase history database 222 and the customer profile data 212 to identify aspects of items (including goods and services) that can be used to determine an alternative for the item which the customer indicated to purchase.

Figure 3:
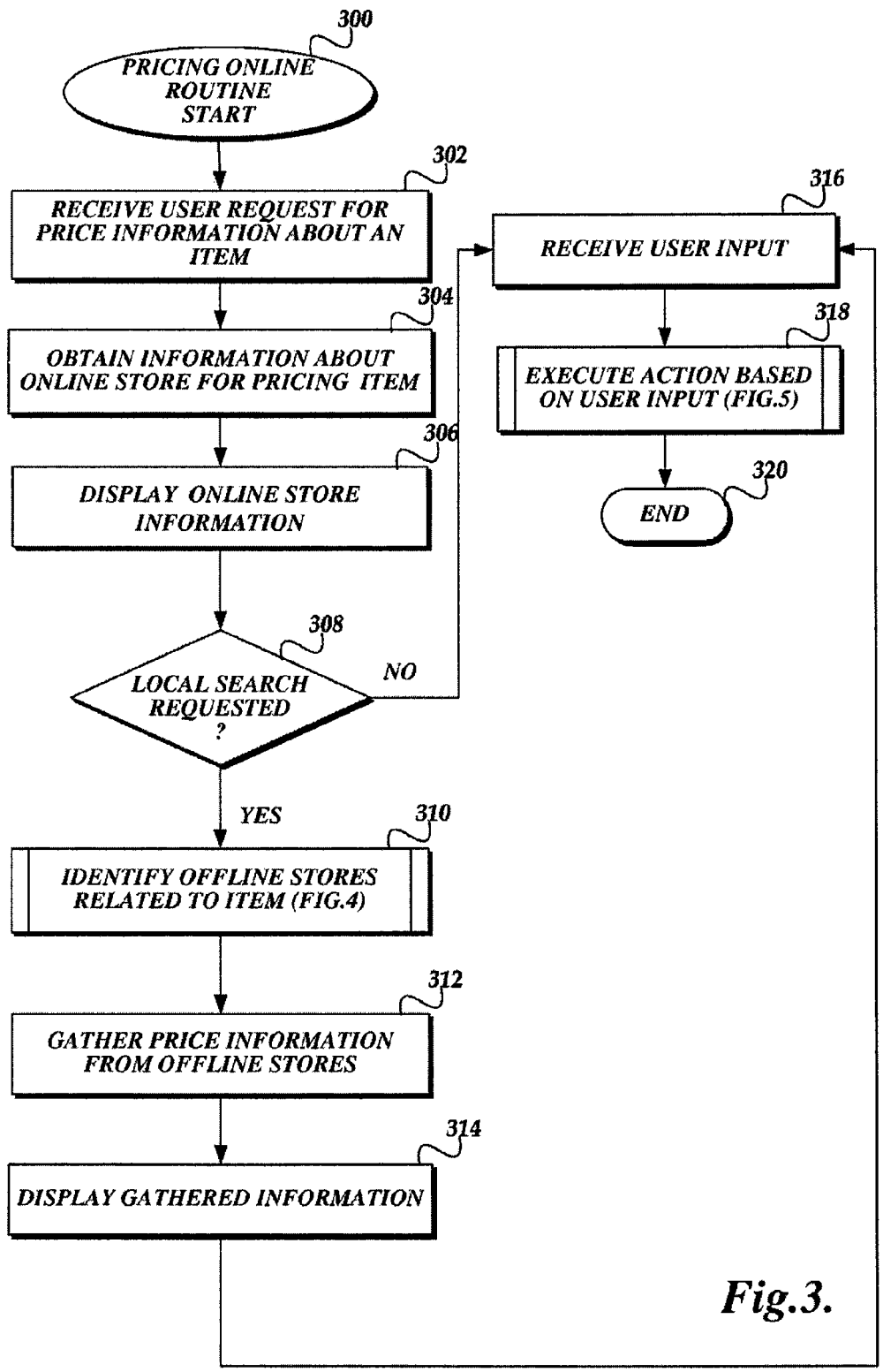
FIG. 3 is a flow diagram of an exemplary routine for pricing an item that is available at online stores and offline stores in accordance with an embodiment of the present invention.

FIG. 3 is a flow diagram of an exemplary online pricing routine 300 for pricing an item. Beginning at block 302, the pricing server 116 receives from a customer (user) a request for information about an item. As will be appreciated by one of ordinary skill in the art, a customer request can be represented in various forms such as voice, text, electronic message, Dual Tone Multi-Frequency (DTMF) tones, or the like. Upon receipt of the information request, information about the customer may be obtained from the customer profile database 212. The information about the customer may include login information, password, customer profile, and customer preference in the customer profile database 212 and/or previous purchases information in the purchase history database 222.

In one embodiment, the customer may want to see price information about the item from online stores before requesting the item's local price information. Generally, the price information service 110 can perform an in-depth search over the Internet, and the best possible price for the item can be found without a significant cost or time spent. The customer may want to use the online price information to leverage negotiation power with local stores.

At block 304, online stores where the item can be purchased via the pricing information service 110 may be determined and the information about the determined online stores may be obtained. Such information about the determined online stores may be retrieved from the catalog server 114. Alternatively, the information may be obtained from a third party online service provider. At block 306, the price information of the item over the online stores may be displayed in conjunction with a hyperlink that points to information regarding the online stores. The information about the online stores may include Web address, customer support information, customer review, and the like.

At decision block 308, a determination is made as to whether the customer requests a local search (a search for local product information) for the item. In one embodiment, a local search may be assumed without the customer's request. If the local search is assumed, the pricing server 116 automatically identifies local stores (offline stores) where the item is available via a subroutine 400 (see FIG. 4) based on available location information. If it is determined at decision block 308 that the customer requested a local search for the item, at block 310 the pricing server 116 may identify local stores (offline stores) where the item is available via the subroutine 400.

After offline stores being identified as having the item available, price information may be gathered from the identified offline stores as illustrated at block 312. As described above, price information can be gathered by the pricing server 116 via a conventional information inquiring method, such as a direct contact with the local stores. The pricing server 116 may include an Interactive Voice Respond System (IVRS), a human agent, an agent application, etc., to contact the identified offline stores. For example, an IVRS may be configured to contact the identified offline stores and conduct automatic queries about the availability and price information of the item. For another example, a human agent may call the identified offline stores and obtain information from the identified offline store as a customer would. The gathered information in conjunction with the information about the contacted offline stores may be stored to the offline store database. It is contemplated that the activities of IVRS or the agent are executed in the background interfacing with a call center service or a human labor bidder service to place a call. Thus, collection of price information may be transparent to the customer.

At block 314, the gathered information is displayed to the customer. In one embodiment, the gathered information may be evaluated against the customer preference to determine a likelihood of selection on each offline store. For example, the customer has indicated that a large volume of available items, customer review, location proximity, low price, etc., are factors the customer considers important. The price server evaluates the offline shops to determine a likelihood of selection based on the above-mentioned factors. As will be appreciated by one of ordinary skill in the art, those factors may also be applied to evaluate online stores. The gathered information may be displayed in the order of the likelihood of selection. In another embodiment, displays of the online store information and the offline store information may be merged together in order for the customer to compare them.

On a customer device, the available stores are displayed to the customer with limited information about the item and/or the available stores. In one embodiment, a hyperlink is typically provided to point to additional detailed information regarding that particular item and/or store. The additional detailed information can be collected through a direct contact with the local store or obtained from the offline store database 218. At block 316, the exemplary routine 300 obtains the customer's input as to whether to proceed with the purchase of the item based on the displayed price information. At block 518, based on the customer's input, an appropriate action will be executed via an execute action subroutine 500. (See FIG. 5.) The routine 300 completes at block 320.

Although the embodiments discussed in conjunction with the routine 300 utilize a human agent or an IVRS to conduct an inquiry process with offline stores, it is contemplated that any suitable agent applications or automated phone service may be utilized. For example, a simple automated phone service may be used to call up offline stores on behalf of the customer. Upon a call connection with an offline store, the automated phone service may play an automated message to inquire about the item via simple commands. The offline store may provide information about the item by responding to the simple commands. The automated messages can be utilized to inquire about the item from several local flower shops at the same time. For purpose of discussion, assume that a customer requests information regarding a daisy bouquet delivery. An automated message may be generated for inquiring about a daisy bouquet delivery upon receipt of the customer's information request. The automated message may be a voice command such as "please press or say 1 if a daisy bouquet is available for a delivery." A local flower shop may respond to the voice command by pressing 1. Then, the automated phone service may inquire about the price by playing a message such as "please enter the price information followed by a pound sign using your touchtone keypad." The local flower shop may respond to the voice command by pressing 29.00# indicating $29.00.

Further, in order to prevent a significant delay in the inquiry process, various screening (filtering) may be employed on offline merchants. Some offline stores that are not fully responsive to the inquiry may be eliminated from consideration. Likewise, some offline stores that do not finish responding to the inquiry within a threshold time may also be eliminated from consideration. Offline stores also filter requests based on items and/or pricing to eliminate any inquiries when it is certain that they do not want to participate in bidding processes. The price server 116 may make a negative review for those eliminated stores and associate the negative review with the corresponding offline store in the offline store database 218. Likewise, the price server may make a positive review for those stores that have been cooperative in responding. The positive review is associated with the corresponding offline store in the offline store database 218. In this manner, for the next search, the pricing server 116 may filter an offline store based on the review from the previous inquiry.

Figure 4:
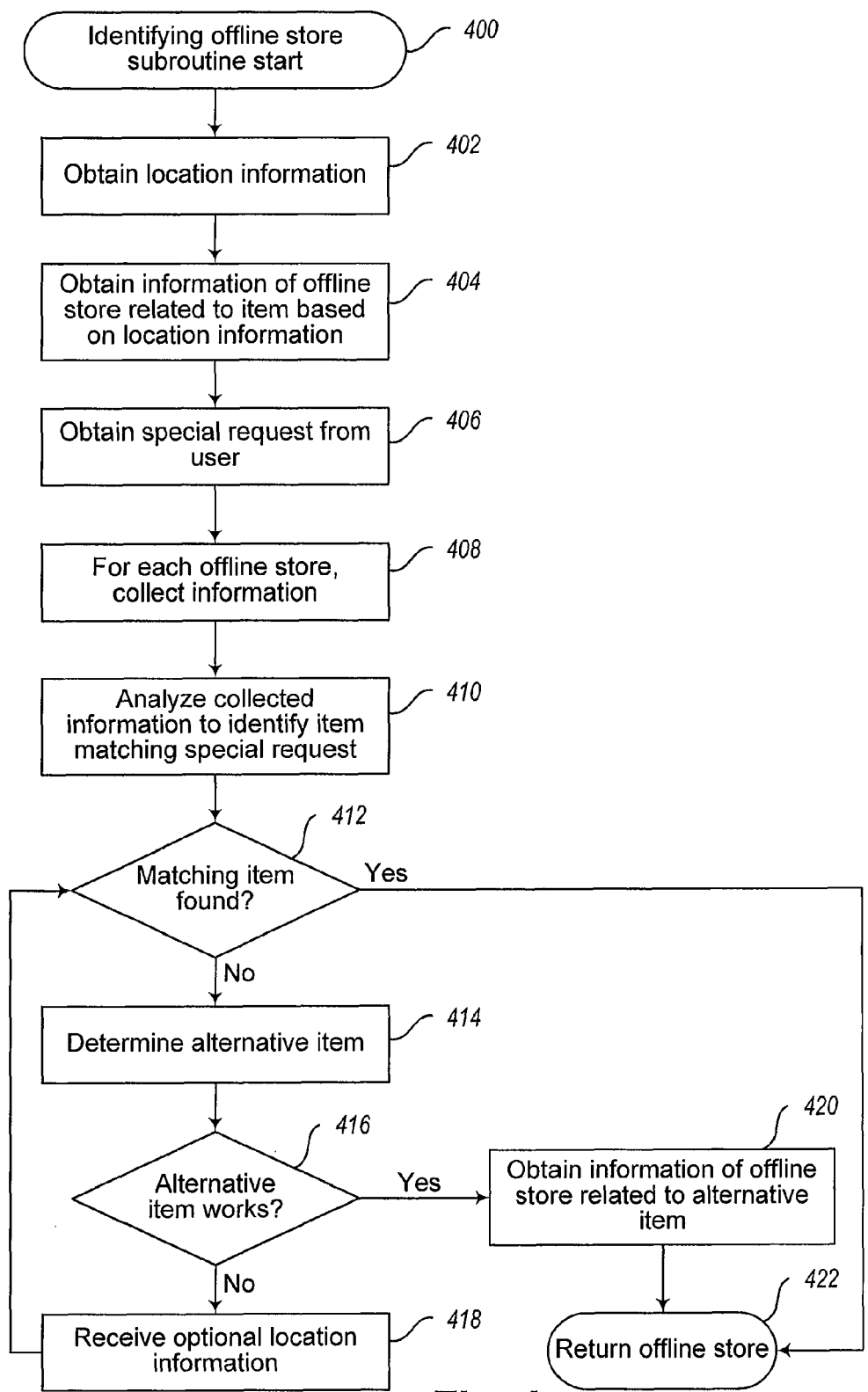
FIG. 4 is a flow diagram of an exemplary subroutine for identifying an offline store based on location information and for finding a matching item from the offline store in accordance with an embodiment of the present invention.

FIG. 4 is a flow diagram illustrating an identifying offline store subroutine 400 utilized in FIG. 3 in accordance with an embodiment of the present invention. At block 402, searching information such as location information, specialty information, etc., is obtained or inputted. A local geographic area is determined based on the location information. For example, if the location information is zip code information, the local geographic area corresponding to the zip code may be determined. At block 404, the pricing server 116 identifies offline stores where the item may be available based on location information and retrieves information about the identified offline stores. As discussed above, offline store information in the offline store database 218 is typically categorized (classified) depending on items available at the particular offline store. The pricing server 116 identifies a group of offline stores located within the local geographic area that have been categorized in the offline store database 218 as able to provide the item. In one embodiment, the offline store database 218 may include customer configuration information which a particular store has specified to define an interested group of customers. The customer configuration information can be any suitable information to filter out potential customers who do not fit into a desirable profile. For example, some offline stores may want to provide price information about home theater products for customers who had purchased a high definition television set in the past. In another embodiment, item inventory information may be included in the offline store database 218 to assist the pricing server to identify offline stores where the item may be available. At block 406, the pricing server 116 may obtain a special request from the customer regarding detailed aspects of the particular item. In addition, the detailed aspects of the particular item may be obtained from the customer profile, previous purchase history, and the like. At block 408, for each identified offline store, the pricing server 116 collects item information including availability information, price information, detailed aspects information, and the like. In some instances, an identified offline store may not have the item in stock although the identified offline store has been categorized (classified) as carrying such item. Further, each item available from the identified offline stores may have additional aspects that may matter to the customer.

At block 410, the pricing server 116 analyzes the collected information to identify an item that matches the special request. If the customer has not made any special request, the pricing server 116 analyzes the collected information to identify an item which matches basic aspects determined from the search criteria. At decision block 412, a determination is made as to whether matching items have been found. If it is determined at decision block 412 that any matching item has not been found, at block 414 the pricing server 116 may determine and suggest an alternative item that is currently available from the identified offline stores. At decision block 416, a determination is made as to whether the customer accepts the alternative item as a substitute for the requested item. If it is determined at decision block 416 that the alternative item works as a substitute, at block 420 the information about the offline store related to the alternative item may be obtained. The subroutine 400 returns information about offline stores where the matching item is available (at decision block 412) or information about offline stores where the alternative item is available (at block 420) and the subroutine 400 completes at block 420.

Figure 5:
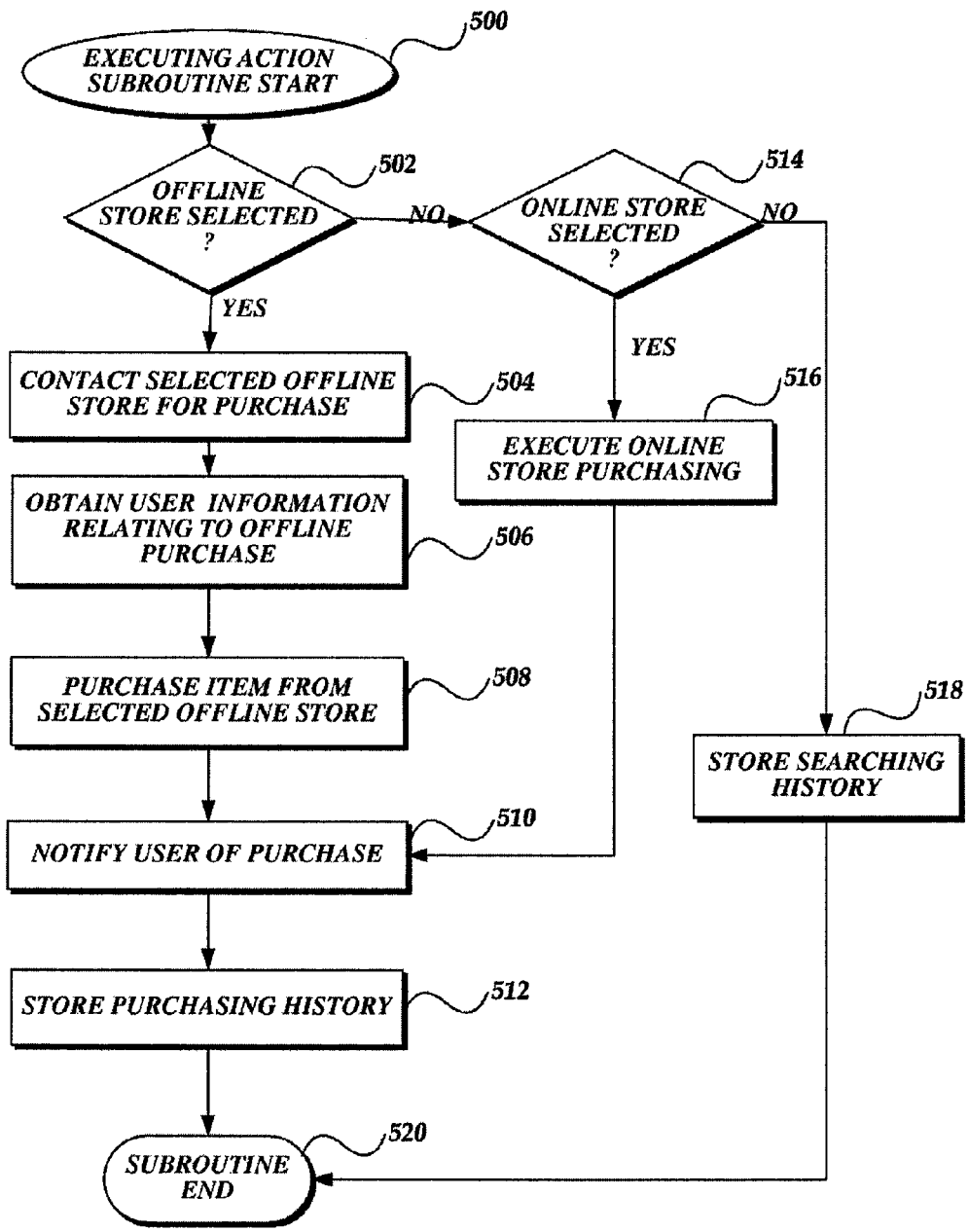
FIG. 5 is a flow diagram of an exemplary subroutine for conducting a purchase of an item in accordance with an embodiment of the present invention.

After the customer enters user input with respect to the gathered information display, the pricing server 116 executes an appropriate action as depicted in FIG. 5. FIG. 5 is a flow diagram illustrating an executing action subroutine 500 in accordance with an embodiment of the present invention. At decision block 502, a determination is made as to whether the customer selected an offline store to purchase an item. If it is determined that the offline store is selected, at block 504 the selected offline store is contacted to purchase the item. In one embodiment, the price server may assist the customer to purchase the item from the selected offline store. As described above, the price server may contact the offline store and purchase the item on behalf of the customer. For example, an automated e-mail or fax may be sent to the offline store. In addition, an agent (e.g., a human agent, an IVRS, etc.) can call the offline store to place an order. In an alternative embodiment, the customer may use gathered information to purchase the item directly from the offline shops.

At block 506, information about the customer that is necessary to conduct an offline purchase is obtained. When the pricing server 116 conducts a purchase transaction with an offline store, information about the customer, such as billing address, phone number, payment method, and the like, may be necessary to finalize the purchase transaction. As mentioned above, such information may be obtained from a customer profile data stored in the customer profile database 212. At block 508, the item may be purchased from the designated offline store. If it is determined at decision block 502 that the customer does not choose to purchase the item from an offline store, at decision block 514 a determination is made as to whether an online store is selected instead. If it is determined at decision block 514 that an online store is selected for a purchase transaction, the pricing information service 110 executes an online purchase transaction.

Upon purchasing the item either from offline stores (at block 508) or online stores (at block 516), the pricing server 116 may notify the customer of a successful purchase transaction as illustrated at block 510. In one embodiment, the customer can set up a rule specifying which customer device will receive the notification or how to receive the notification. In this embodiment, the notification message may be created in accordance with the customer rule.

At block 512, purchasing history may be stored in the purchase history database 222. The purchasing history may be logged after purchasing the item from an online store (block 516) or from an offline store (block 508). If it is determined at decision block 514 that no purchase transaction is requested or after storing the purchasing history (block 512), the routine 500 also logs and stores search history in the purchase history database 222. The search history may include but is not limited to, general information about the item, search criteria, special request, the resulted online stores and offline stores, availability, price information, contact information, other inquired information, or the like.

Figure 6A:
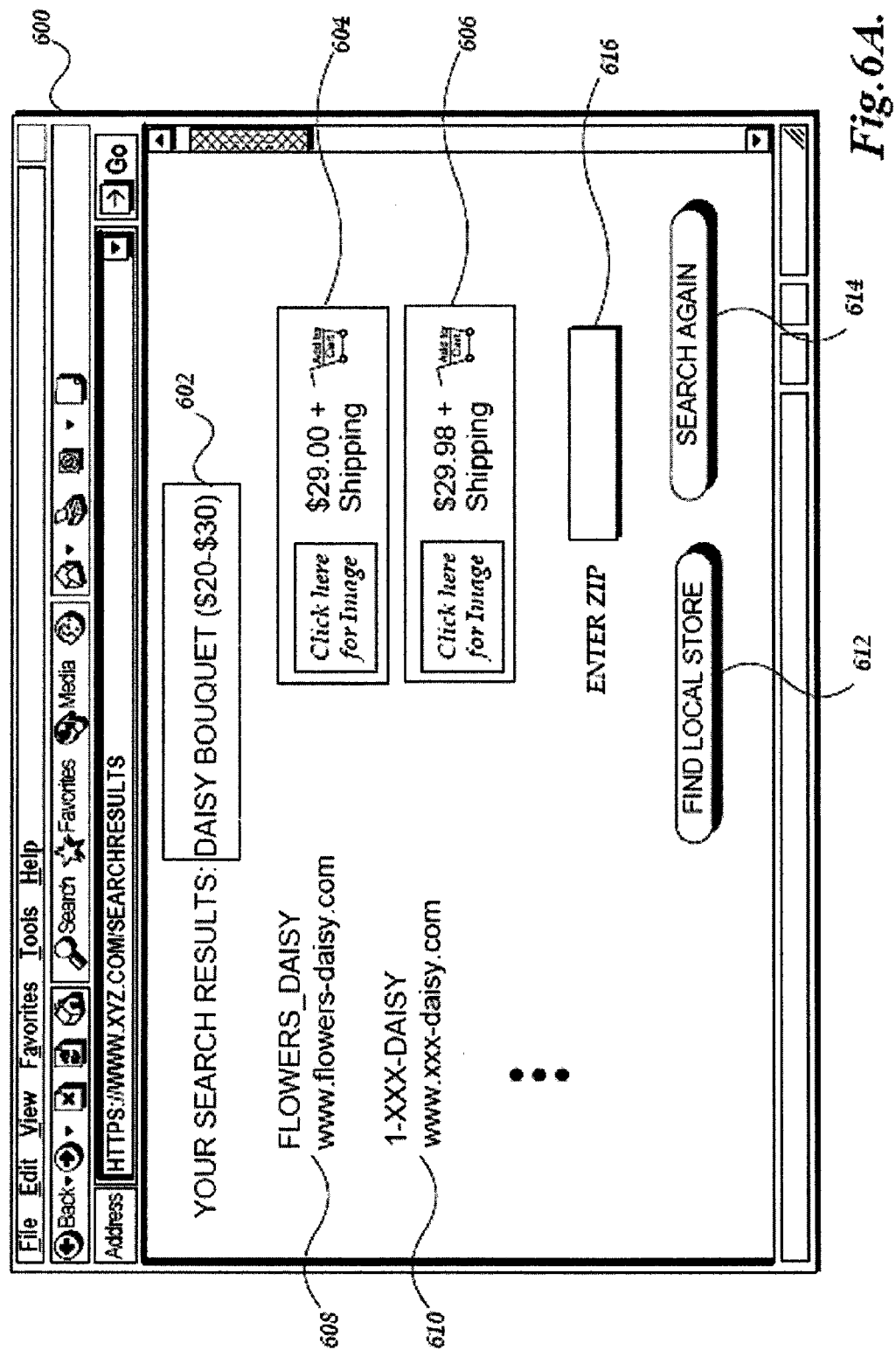
FIGS. 6A-6E are pictorial diagrams of exemplary screen displays for providing information of an item while enabling a user to purchase the item in accordance with an embodiment of the present invention.

Referring now to FIGS. 6A-6E, pictorial diagrams of exemplary screen displays 600 generated on a customer device when a customer has requested information with respect to a flower delivery are shown. In particular, FIG. 6A illustrates an exemplary screen display 600 reflecting the results of a search performed, with the pricing information service 110 for an item (i.e., a service), delivering a particular flower based on the item search criteria 602, "DAISY BOUQUET," with a price range of $20-$30. The screen display 600 includes two matching items 604, 606 from online stores 608, 610 found as a result of the searching. As typical with search results, the items are displayed to the customer with limited information about each item, though each resulting item (result item) is typically provided as a hyperlink to additional detailed information regarding that particular item.

As can be seen in FIG. 6A, while there were two result items that matched the search criteria, and each result item apparently relates to the same "DAISY BOUQUET," each result item available from the online store 608, 610 relates to a separate item in the catalog maintained by the catalog server 114 of the price information service 110. More particularly, result item 604 is a DAISY BOUQUET with a price of $29.00 from a shop in Michigan; result item 606 is a DAISY BOUQUET with a price of $29.98 from a shop in California. In one embodiment, the online stores 608, 610 that are identified as offering the selected item may be an online store with a local address. The online stores in this example may be distinguished from an online vendor with which no physical address is associated. The customer does not yet assess the total price of the result items 604, 606 due to the unknown processing cost, including a shipping and handling fee, restocking fee, etc.

Figure 6B:
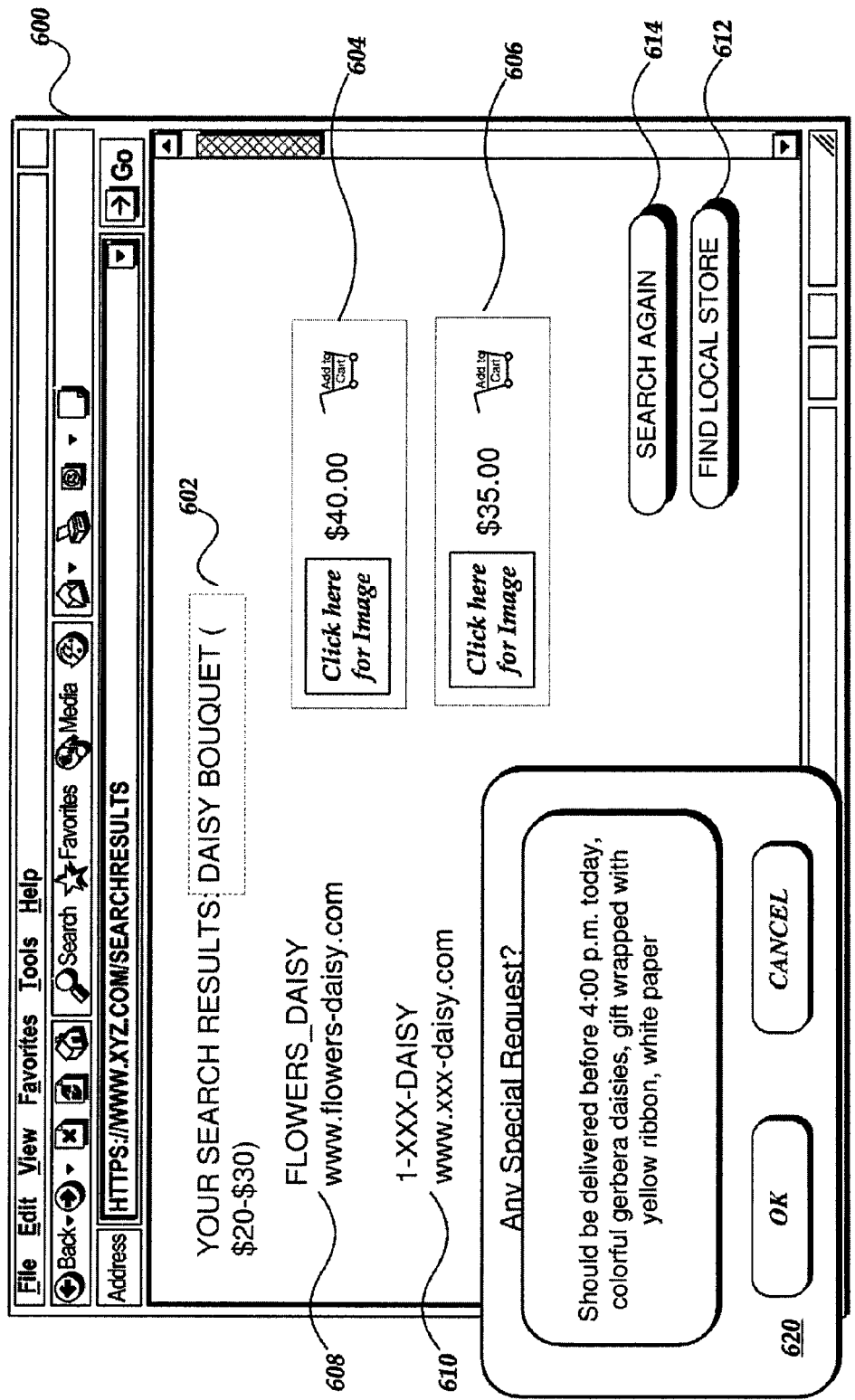

Continuing with this example, assume that the customer wants to know the complete price of the result items 604, 606 and to have information about local stores that are located in the city where the customer resides. In one embodiment, the customer (user) profile information in the customer profile database 212 may be used to determine location information. For example, the location information used for the previous search inquiry may be the default location information. For another example, the customer's resident address may be obtained from the customer profile database 212 for the default location information. The obtained local information (default location information) will be presented to the customer for confirmation. In another embodiment, the customer may provide location information to define a geographic area where the customer wishes to find local stores, for example, zip code information 616, to the price server 116. In some instances, when the customer is not able to provide location information, the pricing server 116 obtains location information from a location information source such as customer devices, a location service provider, or the like. For example, if the customer wants to find local price information while traveling, the price server may obtain GPS location information of a customer's mobile phone. Based on the location information, the pricing information server may calculate the shipping cost of the result items 604, 606 and the total cost of the result items 604, 606. In FIG. 6B, the exemplary screen display 600 reflects the total cost of each result item 604, 606 after the shipping cost has been calculated. Assume that the customer feels that the shipping cost is excessive. The customer may want to compare local price information if the item is purchased locally (thus avoiding a shipping cost). The customer may request a local store search by selecting the FIND LOCAL STORE button 612 or a new search by selecting the SEARCH AGAIN button 614.

In the present example, the customer may also want to compare the price information about the result items 604, 606 with price information about the item "DAISY BOUQUET," which is available from local stores. When the FIND LOCAL STORE button 612 is selected, the pricing server 116 may determine location information about the purchase. In this present example, zip code information is used to define the geographic area of the local stores. In one embodiment, a special request window 620 is displayed to receive detailed aspects of the item from the customer. In an aspect of an embodiment, the pricing server 116 can search local stores using a conventional method such as a phone conversation and, thus, the pricing server 116 is able to perform a more granulated price information search. The pricing server 116 can seek local stores that offer a matching item with a level of detail that would not be possibly addressed to the retail server for an online store search. Further, the pricing server 116 can negotiate with local stores to accommodate the detailed aspects of the item. In another aspect of an embodiment, the pricing server 116 can batch send an inquiry request about information to multiple offline stores at once. The inquiry request may be a fax, e-mail, automated voice message, or the like.

In the illustrated special request window 620, the customer may enter the detailed aspects of the item "DAISY BOUQUET." Assume that the customer specifies "delivery before 4:00 PM," same day delivery, "GERBERA DAISY BOUQUET," yellow ribbon and white paper gift wrap via special request window 620. Initially, the pricing server 116 may identify local flower stores based on the location information. As mentioned above, the information about local stores may be categorized by items or aspects of items. One of the examples may be a directory listing database organized by predetermined categories and sub-categories of items that are generally available at a store. After identifying the local flower stores, the pricing server 116 may contact each local flower store to gather information about availability of a GERBERA DAISY BOUQUET, whether same day delivery is available, price information, whether a specific gift wrap is available, etc. Based on the gathered information, the search is concluded after identifying a group of local flower shops where a GERBERA DAISY BOUQUET can be delivered before 4:00 p.m. with a price range of $20-$30. In one embodiment, some of the identified offline shops may be evaluated while the price server is gathering information. If the contacted offline shop is not fully responsive to the inquiry, such offline shop will be eliminated from the displayed offline shops. Some offline shops that cannot provide requested information within a predetermined period may also be eliminated from the displayed offline shops. Further, the pricing server 116 may generate log information regarding such offline shops and store the log information in the offline store database 218.

Figure 6C:
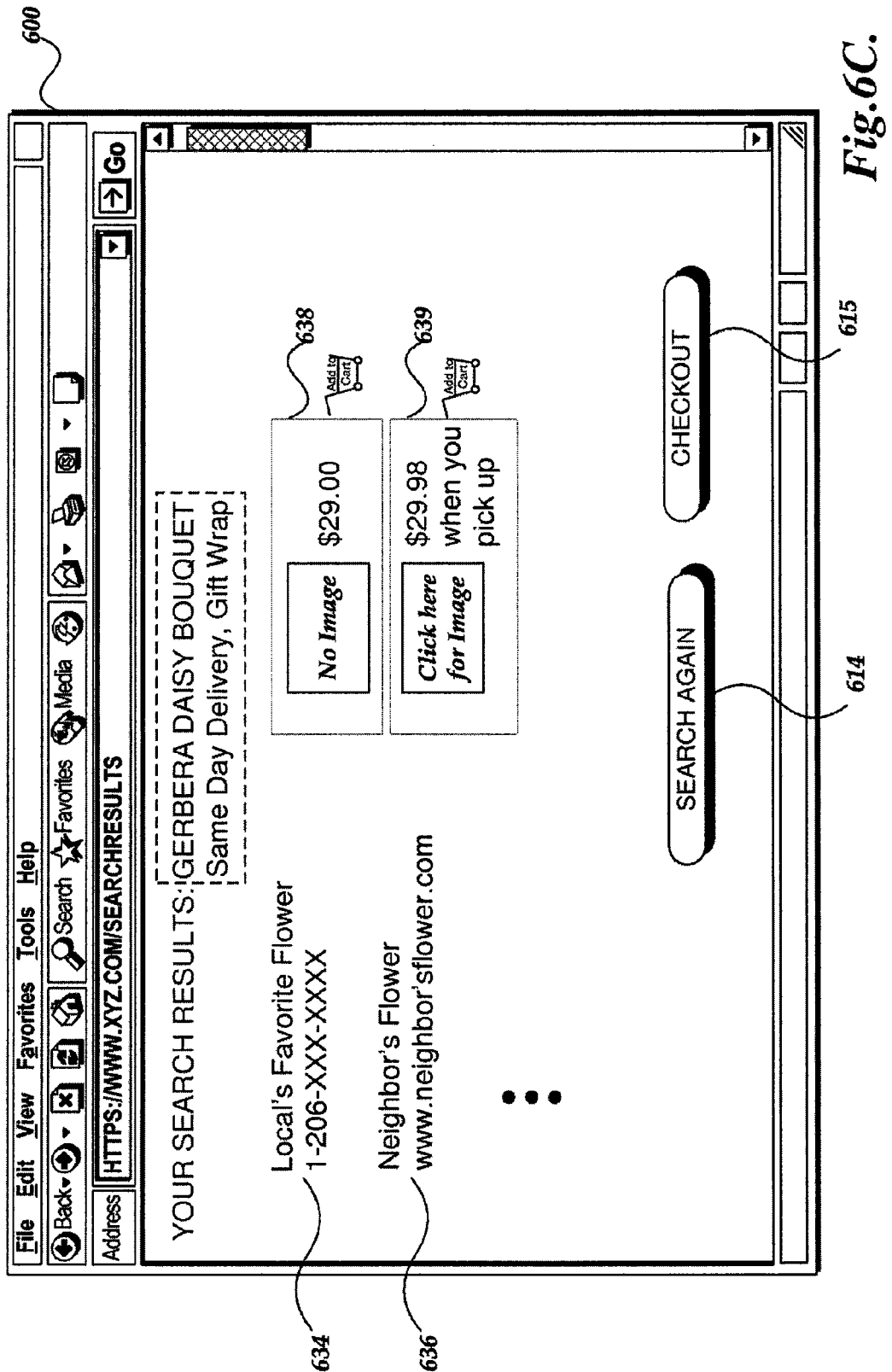

FIG. 6C is the exemplary screen display 600 reflecting the results of a local store search performed with the pricing information service 110 based on the detailed aspects of the item and previously-entered search criteria. As can be seen in FIG. 6C, there were two local stores 634, 636 where the requested item matching with the detailed aspects is available. More particularly, local store 634 can deliver a GERBERA DAISY BOUQUET for $29.00 and local store 636 offers to the customer a GERBERA DAISY BOUQUET for $29.98 if the customer is willing to pick up the item from the local store 636. Limited information about each result item may be provided to the customer, although additional detailed information regarding that particular item may be readily available to the customer. Further, the information relating to the local stores 634, 636, such as a phone number, address, promotions, etc., is provided to the customer. The promotions may be obtained during the price information inquiry or from an advertisement disseminated to potential customers. Such advertisement can be found in a local newspaper, a yellow page service provider, a Web page, or the like. For example, the local store 636 has a Web site for its promotion but it is not yet capable of enabling a customer to purchase items over a network. The promotion information may be collected separately from the pricing information inquiry.

In some instances, the pricing server 116 may identify a local store that also provides online service with the pricing information service 110. Generally, though a same merchant maintains both online and offline stores, price information and presentation on an item available at the online store can differ from those available at the offline store. The pricing server 116 may contact the local store for local price information. If the price of an item offered by the online store is less that that of an item offered by the local store, an agent of the pricing server 116 may negotiate with the local store to get the same price offered by the online store.

In another embodiment, the pricing server 116 may assist a customer to purchase a selected item from local stores 634, 636. For example, the customer chooses to order a DAISY BOUQUET from local store 634 by selecting the "add-to-cart" icon displayed next to result item 638. The price server may store information relating to the item and local store 634 in a temporary memory and allow the customer to continue to request price information on other items. A purchase transaction may be started in accordance with the customer's preference. Thus, the customer can rely on the pricing server 116 to conduct a purchase transaction, or the customer can contact local stores to purchase an item. In this present example, after selecting result item 638, the customer may choose the CHECK OUT 615 button to purchase the item (DAISY BOUQUET delivery). The pricing server 116 may contact local store 634 on behalf of the customer to place an order of DAISY BOUQUET delivery. In one embodiment, the pricing server 116 may obtain a pre-order number of the item from the local stores while the pricing server 116 gathers information from or negotiates with the local stores. Later on, the pre-order number can be used to expedite a purchase transaction between a local store and the pricing server 116 (or the customer).

Figure 6D:
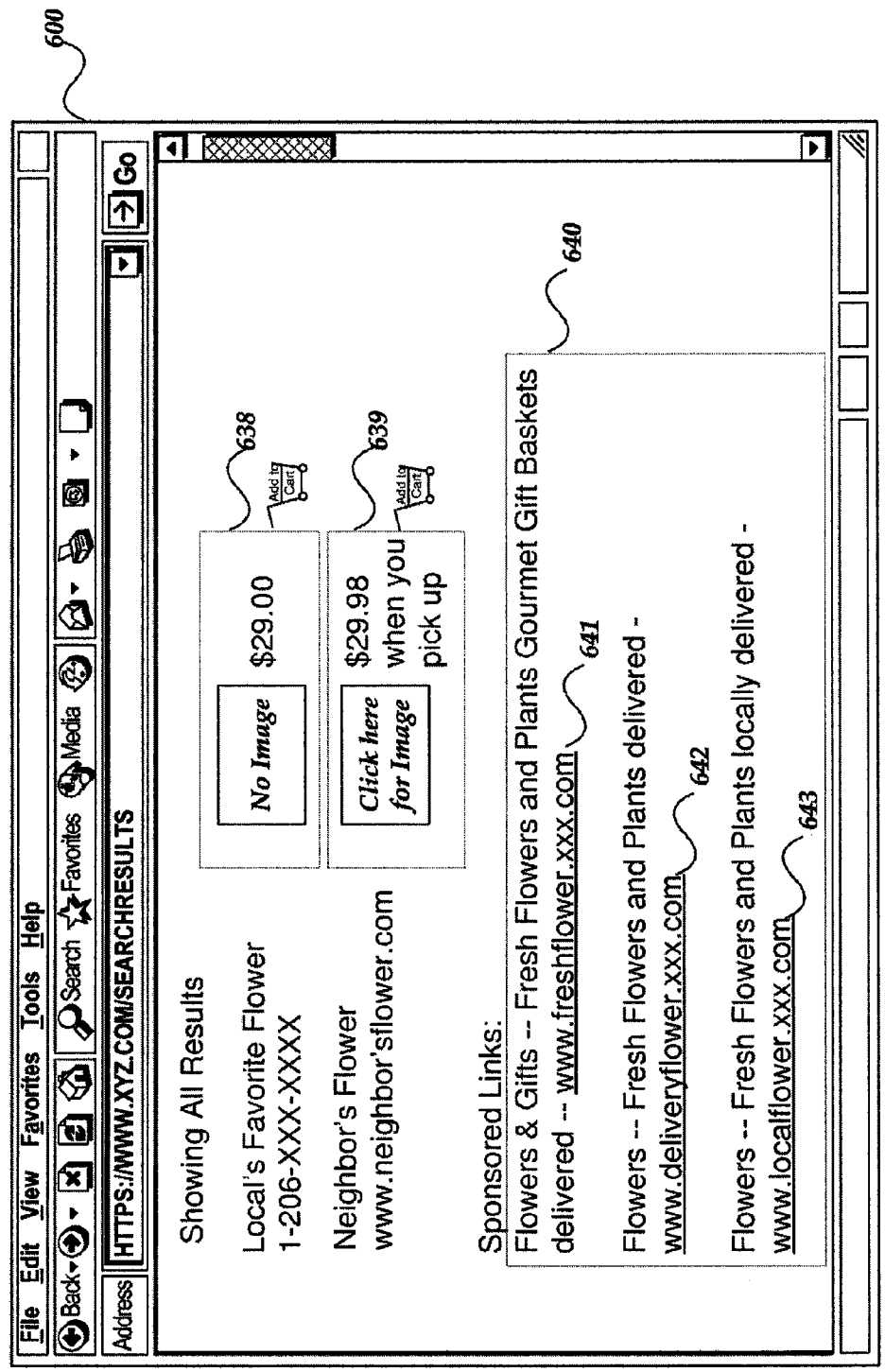
Figure 6E:
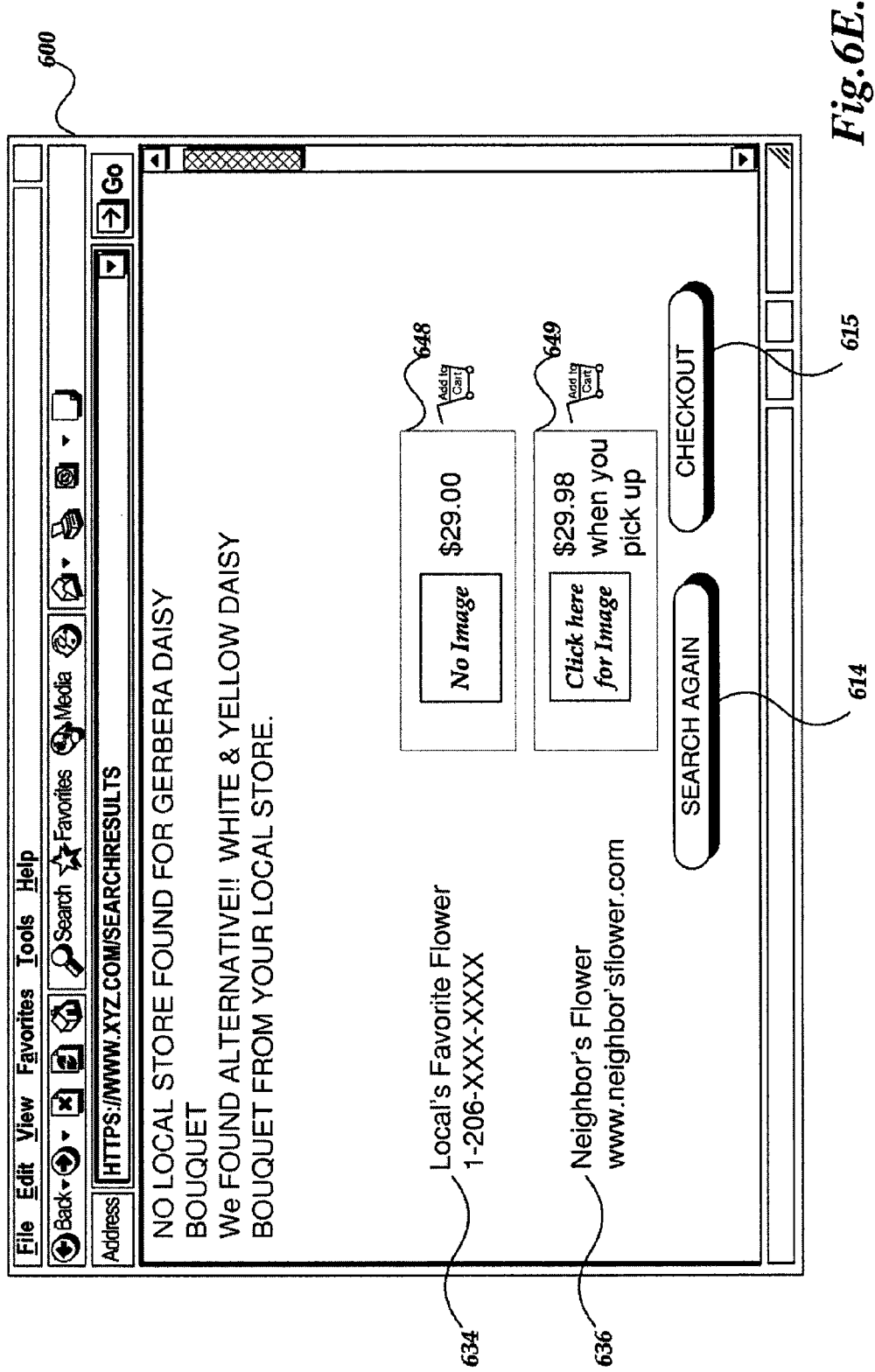

FIG. 6D is the exemplary screen display 600 displaying other information useful for the customer while reflecting the results of a local store search illustrated in FIG. 6C. For example, sponsored (advertising) links information 640 may be displayed to provide more purchasing options to the customer. In an illustrative embodiment, the customer can navigate a Web site of an online store via a corresponding sponsored link. As shown in FIG. 6D, the sponsored links 641, 642, 643 corresponding to online flower shops may be identified for the customer. If the customer selects one from the sponsored links 641, 642, 643, the customer can obtain item information or purchase the item (or other items) from the online store corresponding to the selected sponsored link 641, 642, 643. In some instances, no matching item may be available from either the online stores or the offline stores within the local geographic area specified by the location information. In such a case, the pricing server 116 may search for an alternative item that is available from the identified online or offline store and may suggest the alternative item to the customer. FIG. 6E illustrates the exemplary screen display 600 from FIG. 6B after the pricing server 116 determines that no matching item is available. An alternative item search may be performed with the pricing server 116 based on the customer preferences, the detailed aspects of the item, the previous purchase histories of other items, and the like. Assuming that a GERBERA DAISY BOUQUET is not available, but the previous purchase history indicates that a white and yellow daisy bouquet was purchased before, the pricing server 116 presents a white and yellow daisy bouquet as an alternative to a GERBERA DAISY BOUQUET to the customer. As shown in FIG. 6E, instead of a GERBERA DAISY BOUQUET, a white and yellow daisy bouquet is available from two local flower shops 634, 636. The customer may be given a choice to select the white and yellow daisy bouquet or decline the alternative and start a new search. When the customer selects the alternative for a purchase, for example the white and yellow daisy bouquet, the information related to the alternative item may be stored. The stored information may be used to suggest an item to other customers before an information search on an item begins. For example, the white and yellow daisy may be suggested to other customers without conducting any search on the gerbera daisy delivery.

While the above-described example presents an alternative item (if available) to the customer for the customer's selection, according to alternative embodiments of the invention, if an alternative item is available, a substitution is made automatically, i.e., without customer notification and confirmation. Additionally, the customer profile information in the customer profile database 212 may include configuration information indicating when and under what circumstances automatic substitutions may be made.

Figure 7:
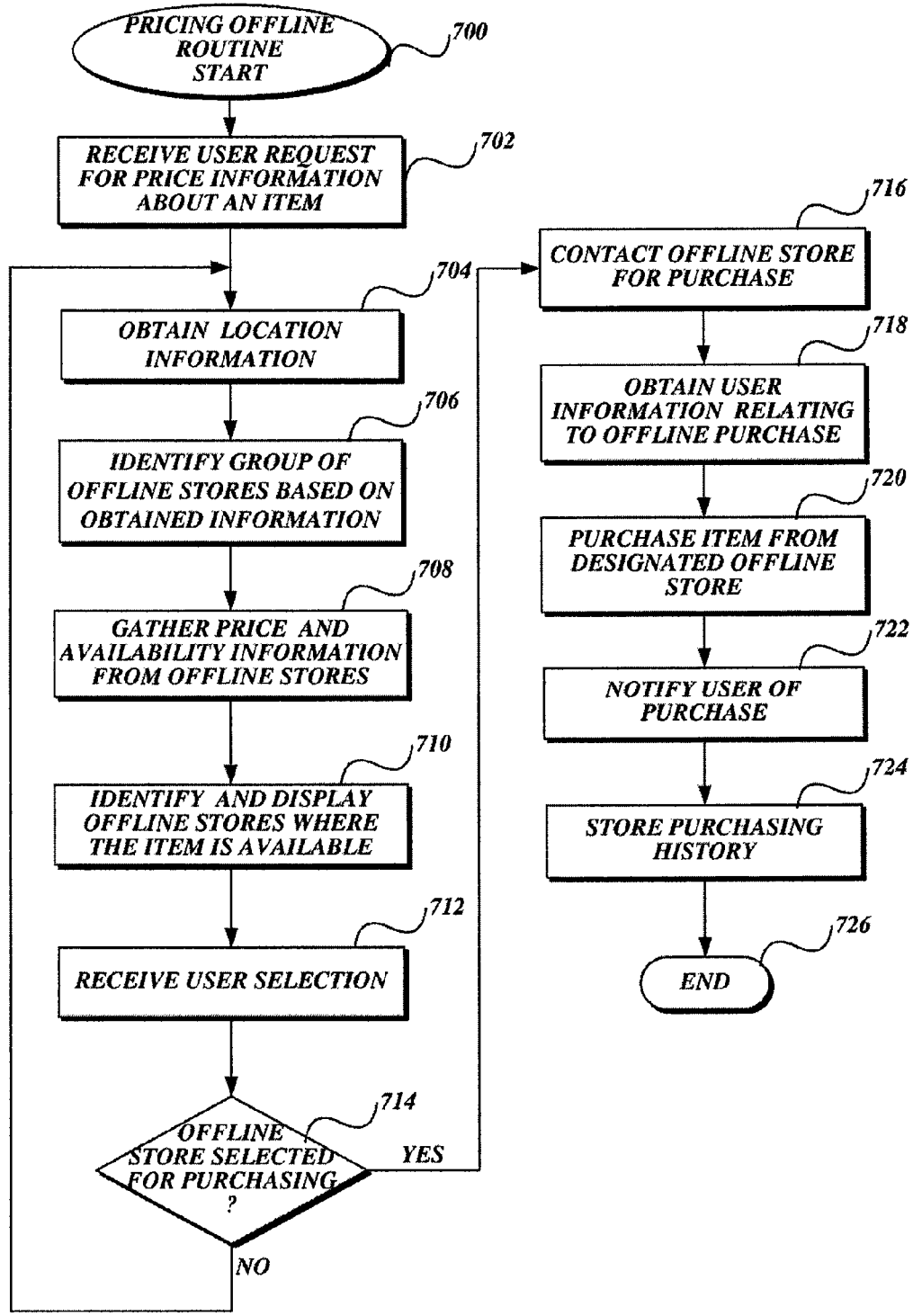
FIG. 7 is a flow diagram of an exemplary routine for pricing an item that is available at offline stores and for enabling a user to purchase the item in accordance with an embodiment of the present invention.

FIG. 7 is a flow diagram of an exemplary pricing offline routine 700 for pricing an item that is available at offline stores. Beginning at block 702, the pricing server 116 receives from a customer a request for local information about an item. At block 704, location information may be obtained to determine a local geographic area. The location information may be residential address information of the customer, physical location information of the customer, desired location provided by the customer, or the like. For example, the customer may provide location information where the customer is planning to visit. A limited geographic area may be determined based on the location information. At block 706, a group of offline stores where the item can be purchased, which are located within the limited geographic area, may be identified. At block 708, price information may be gathered from the identified offline stores.

As described above, price information can be gathered by the pricing server 116 via a conventional information inquiring method, such as a direct contact with the local stores. The pricing server 116 may include an IVRS, an agent, etc., to contact the identified offline stores. For example, an IVRS may contact the identified offline stores to query availability of the item, price information, detailed aspects, or the like. For another example, a human agent may call the identified offline stores and obtain information from the identified offline store as the customer would for a conventional shopping of the item.

In addition, price information of an item may be obtained from the previous purchase history if the item has been purchased from a particular offline store. The pricing server 116 may confirm the price information with the offline store. Further, offline store information in the offline store database 218 may include an offline store configuration indicating guaranteed availability and price information for items at a previously contacted offline store. For example, during an inquiry about a children's dictionary, a local book store has indicated that the children's dictionary would be available for the current month with a sale price of $9.00. The price server stores such information to the offline store database 218 and/or the purchase history database 222.

At block 710, available offline stores (where the item is currently available) are identified and displayed to the customer. In one embodiment, the available offline stores are displayed to the customer on a customer device with limited information about the item and the available stores, although a hyperlink is typically provided to point to additional detailed information regarding that particular item. Further, the information relating to the local stores such as a phone number, address, direction, map, etc., is provided to the customer. At block 712, a customer's input, indicating a decision to select an offline store or restart the pricing information search, is received.

At decision block 714, a determination is made as to whether an offline store from the identified group is selected for a purchase transaction. If it is determined at decision block 714 that the customer did not select any store from the identified group of offline stores, the routine proceeds to block 704 where new location information is obtained to identify more offline stores. The routine will repeat the above steps until the customer selects at least one store from the identified group of offline stores. As will be appreciated by one of ordinary skill in the art, if the local geographic area is broadened, more offline stores can be identified. If it is determined at decision block 714 that one store from the identified group of offline stores is selected, at block 716, the selected offline store is contacted to purchase the item.

In one embodiment, the price server may assist the customer in purchasing the item from the offline store. As described above, the price server may contact the selected offline store and purchase the item on behalf of the customer. For example, an automated e-mail or fax may be sent to the offline store. In addition, an agent (e.g., a human agent, an IVRS, etc.) can call the offline store to place an order. In an alternative embodiment, the customer may use gathered information to purchase the item directly from the offline shops.

At block 718, information about the customer that is necessary to purchase an item is obtained. When the pricing server 116 conducts a purchase transaction with the offline stores, information about the customer, such as address, phone number, payment method, and the like may be necessary to finalize the purchase transaction. As mentioned above, such information may be obtained from the customer profile database 212. At block 720, the item may be purchased from the selected offline store. Upon purchasing the item, the pricing server 116 may notify the customer about a successful purchase transaction as illustrated at block 722. In addition, the user is notified if the purchase transaction was unsuccessful. As described above, a notification message may be created and transmitted in accordance with the customer's preference. At block 724, the purchasing history may be logged and stored in the purchase history database 222. The routine completes at block 726.

Figure 8A:
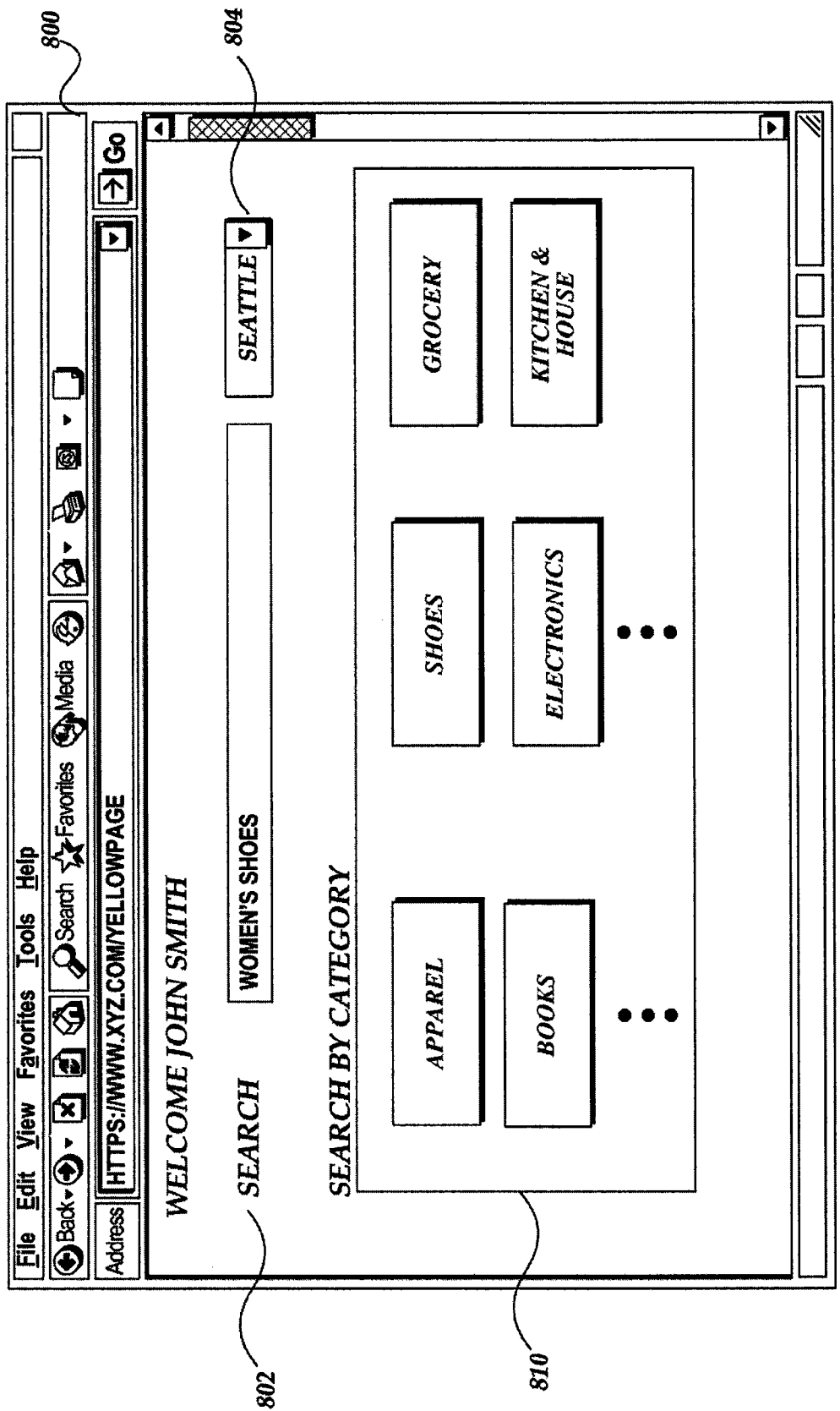
FIGS. 8A-8D are pictorial diagrams of exemplary screen displays for a user to conduct an information search of an item that is available at offline stores located within a limited geographic area in accordance with an embodiment of the present invention.

Referring to FIGS. 8A-8D, pictorial diagrams of exemplary screen 800 are generated on a customer device after the customer requests local price information with respect to an item in accordance with an embodiment of the present invention. In particular, FIG. 8A illustrates an exemplary screen display 800 reflecting an initial search window for receiving a customer's search request that can be facilitated via two different searches 802, 810. One search may be a simple query search 802 based on the item search criteria 804. As described above in FIGS. 6A-6D, the pricing server 116 (or the pricing service provider 130) enables the customer to input the item search criteria 804 (e.g., "women's shoes" in Seattle, Wash.) and search price information based on the item search criteria 804. In one embodiment, the offline store information may be organized based on a product classification (a product family) of an item that is generally available at the offline stores. The pricing server 116 identifies the item from the item search criteria 804 and classifies the item into a product family.

Another search may be a search by category 810. The pricing server 116 enables the customer to select a product family corresponding to the item to start a price information search. In one embodiment, each product family may be organized in a tree structure. As can be seen in FIG. 8A, each product family may be presented to the customer. The customer may identify a product family corresponding to the item. For example, SHOES 814 may be chosen for "women's shoes," which will eventually lead the customer to choose "women's shoes" to narrow the search scope.

Figure 8B:
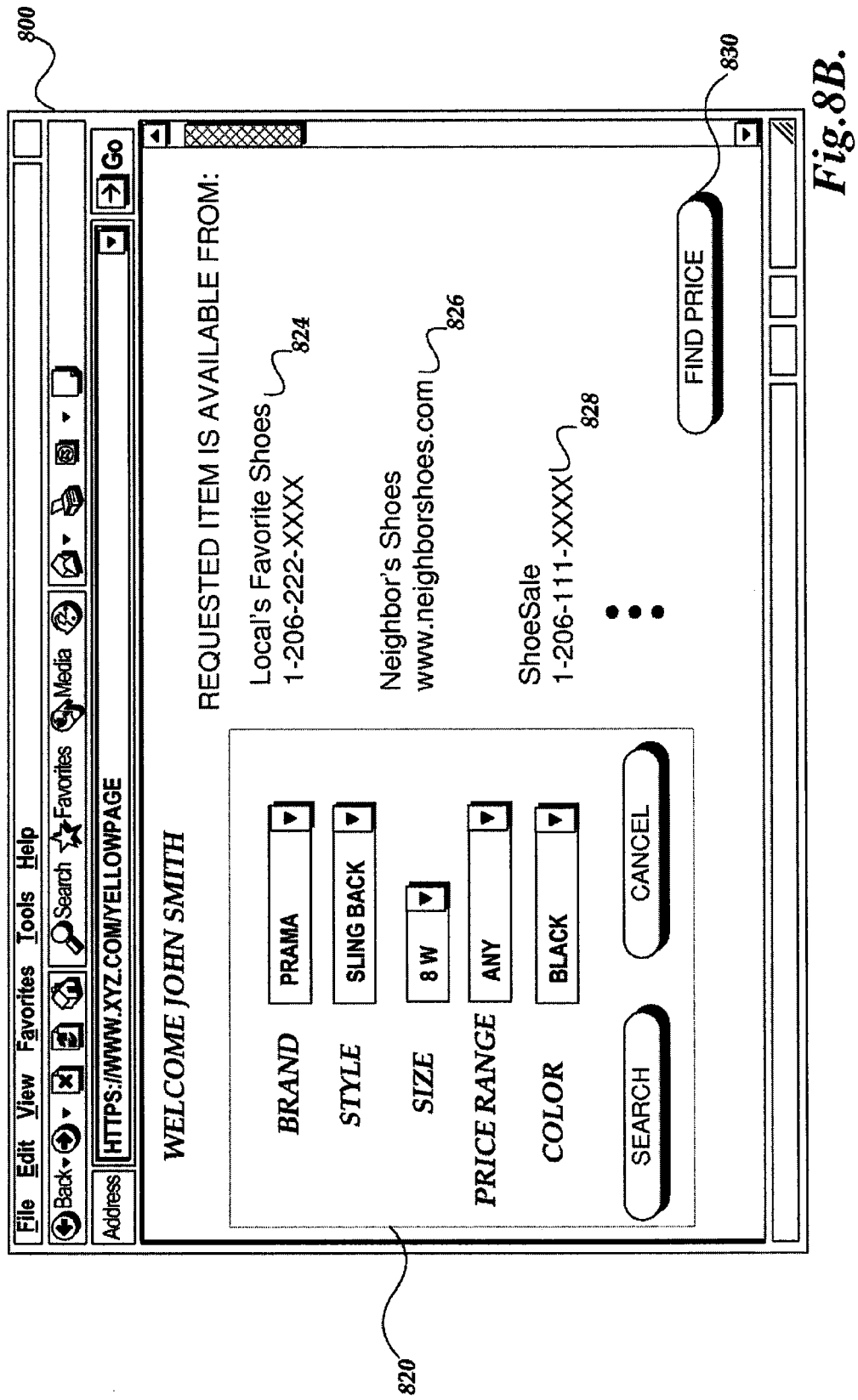

In FIG. 8B, the exemplary screen display 800 includes a detailed aspect window 820 after the item search criteria has been determined. More particularly, the detailed aspect window 820 is presented to receive user input about basic aspects relating to the "SHOE" product family, which include, but are not limited to, brand, style, size, color, price range, and the like. A detailed aspect window may differ from one product family to another.

The pricing server 116 may seek the local store that can offer a matching item with the detailed aspects specified by the customer. Further, the pricing server 116 can negotiate with local stores to accommodate the detailed aspects of the item. The exemplary screen display 800 reflects the results of a local store search performed with the pricing information service 110 based on the detailed aspects of the item. As can be seen in FIG. 8B, there were three local stores 824, 826, 828 where the requested item with the detailed aspects can be purchased. In the exemplary screen 800, the customer can request detailed information by selecting FIND PRICE 830. Upon receipt of the request of the detailed information, the pricing server 116 may contact local shoe stores to gather information about the item (e.g., Prama black sling-back shoes in a size 8 W).

Figure 8C:
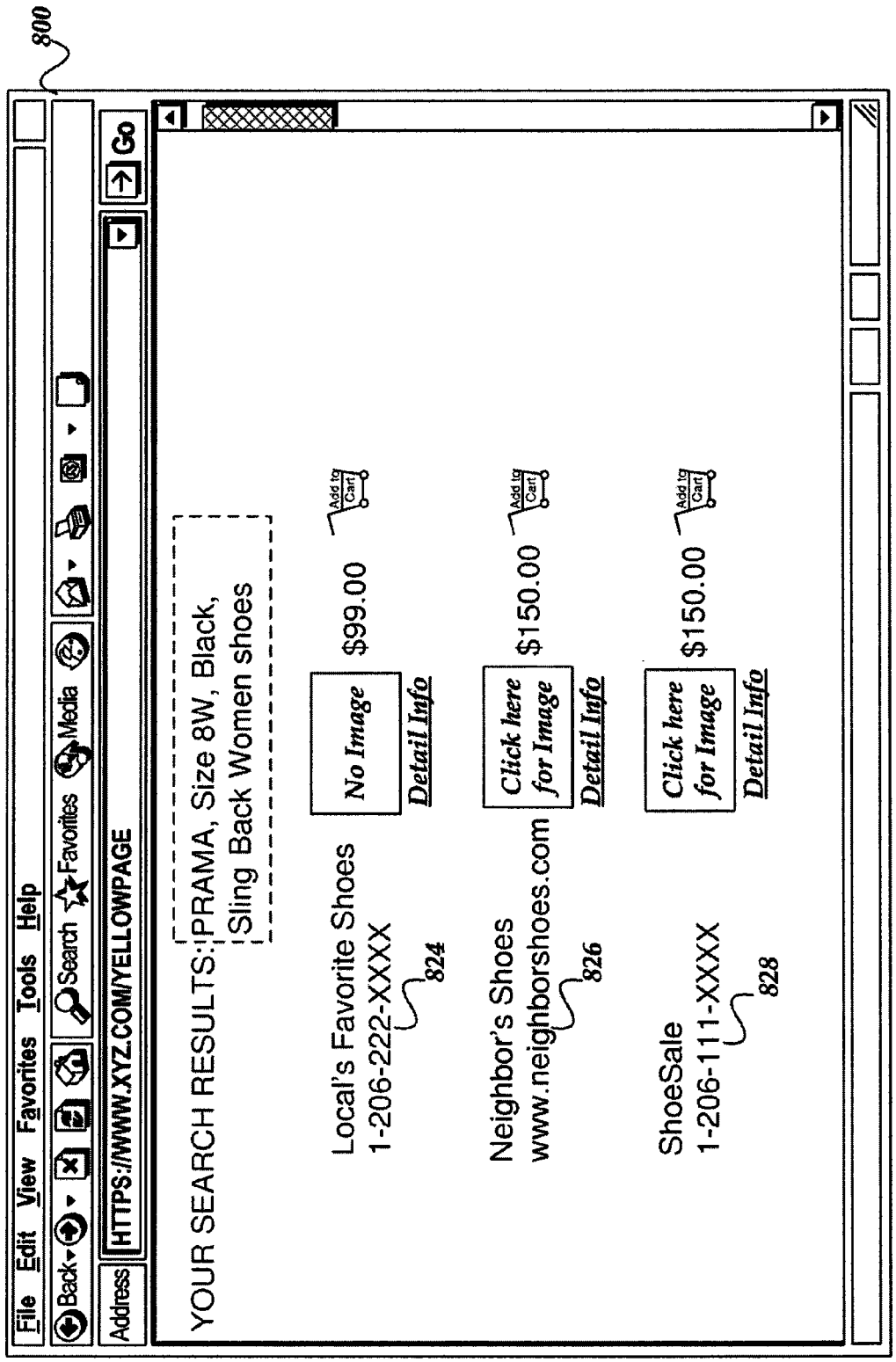

Referring to FIG. 8C, an exemplary screen display 800 reflecting the gathered information regarding the requested item from local stores 842, 826, 827 is shown. More particularly, local store 824 has the item for $99.00, local store 826 has the item for $150.00 and local store 828 has the item for $150.00. As is typical with search results, the items are displayed to the customer with limited information about each item, though each result item is typically provided as a hyperlink to additional detailed information, for example, a photo image, regarding that particular item. Further, the detailed information relating to the local stores 824, 826, 828 such as a phone number, store address, maps, direction, etc., may also be provided to the customer. In this present example, the local store 826 has a Web site for its advertisement but it is not yet capable of enabling a customer to purchase items over a network.

In one embodiment, the pricing server 116 may identify a local store that also maintains an online store service with the pricing information service 110. The pricing server 116 may enable the customer to purchase the item either from the local store or from the online store. If the customer chooses to purchase an item from the offline store, the pricing server 116 may contact the local stores instead of the online store and gather information about the item. On behalf of the customer, an agent of the pricing server 116 may negotiate with the local store to meet the price offered by the online stores.

As with FIGS. 6A-6D, the pricing server 116 may assist a customer to purchase a selected item from local stores 824, 826, 828. The customer can rely on the pricing server 116 to conduct a purchase transaction or the customer can contact local stores directly to purchase an item. The pricing server 116 may contact a selected local store 824, 826, 828 on behalf of the customer to place an order of Prama black sling-back shoes.

Figure 8D:
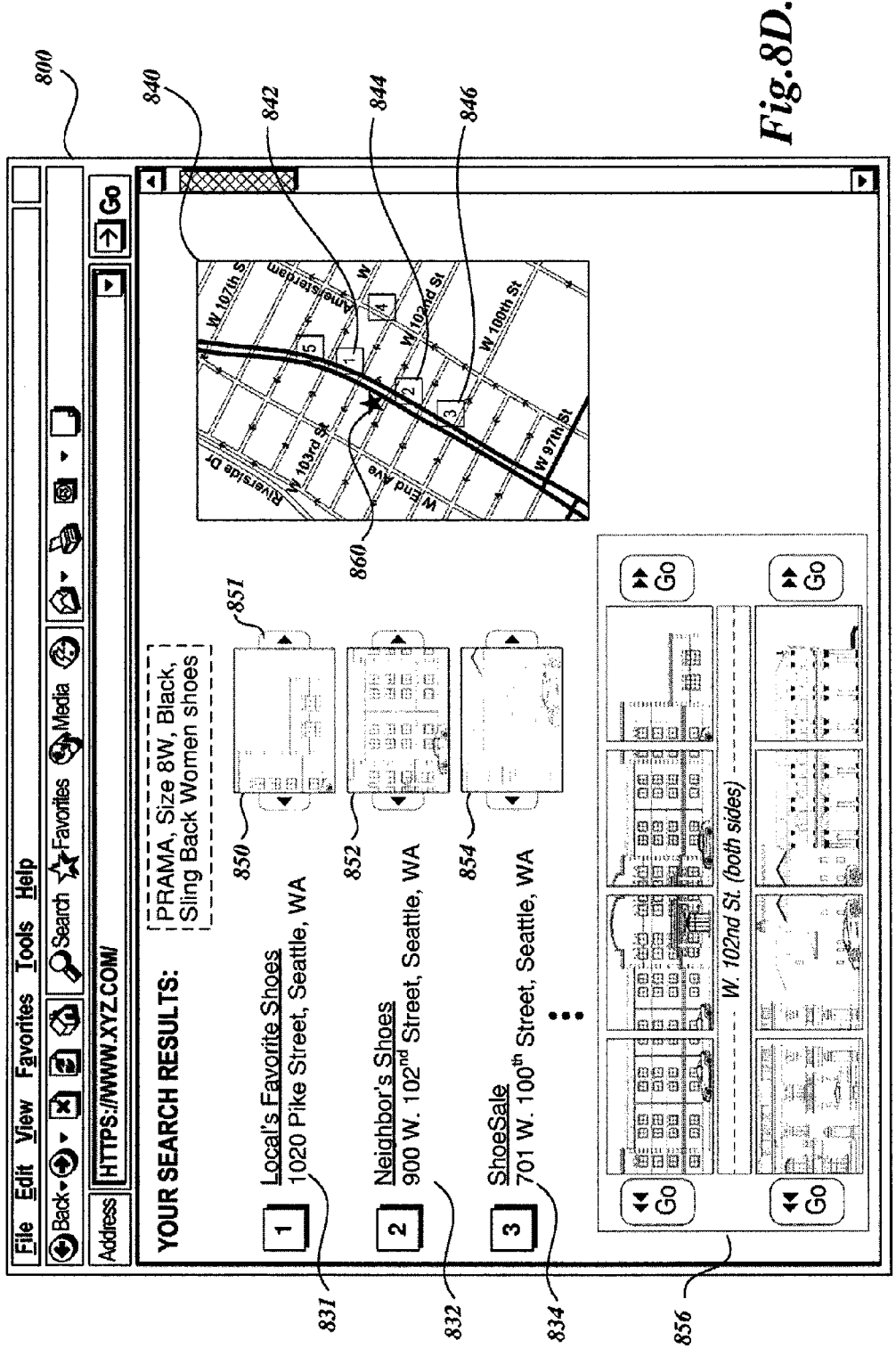

In FIG. 8D, the exemplary screen display 800 includes a map information window 840 indicating where several local stores are located. The map information window 840 may display a street map identifying the location of each of the local stores 831, 832, 834. For example, "Local's Favorite Shoes" 831 may be identified as the first item in the map information window 840 with a corresponding identifier 842 (e.g., graphical icon). The identifier may be the number of the store as included in the exemplary screen display 800, an image of the structure in which the store is located, the trademark of the store, or any other identifier of the store.

In one embodiment, the identifiers 842, 844, 846 may be interactive. For example, if a customer positions a pointing device, such as a mouse pointer, over the identifiers 842, 844, 846 included in the map shown in the map information window 840, the corresponding stores 831, 832, 834 may be emphasized. Likewise, if a customer positions a pointing device over stores 831, 832, 834, the corresponding identifiers 842, 844, 846 may be emphasized. In an illustrative embodiment, an identifier 842, 844, 846 or a located store 831, 832, 834 may be emphasized by highlighting, changing the color, changing the size, changing the shape, or performing any other form of visual alteration on the identifier, image, or business name to thereby distinguish it from other material included. In one embodiment, an identifier 842, 844, 846 may be selected to obtain detailed information about its corresponding store 831, 832, 834.

The exemplary screen display 800 also includes a representative image 850, 852, 853 of the located store 831, 832, 834. The representative image may be one of the images previously correlated with the address of a store (i.e., an image of the actual structure containing the store), the photographic images either being previously taken or provided (e.g., uploaded) by a user. In one embodiment, a block-view of the area where the corresponding store is located in the map information window 840 may be displayed. As an example, a representative image may include different images, such as the geographically adjacent correlated images which can be navigated via a user request. A user may be allowed to view the geographically adjacent correlated images to the left or right of the store identified in the screen display 800. For example, if a user requests to view the right of the store 831 via a user selection 851, the next geographic image correlated with the store 831 would be displayed in the image box 850. Further, the screen display 800 may include a block-view window 856. In one embodiment, a user can select a desired location 860 to start a block-view (i.e., start viewing the images in a geographic sequence correlated with the selected location). The images shown in the block-view window 856 may be photographic images being previously taken. Subsequent to the user selection, a group of images in a filmstrip-type view correlated with the selected location 860 may be displayed within the block-view window 856. As will be appreciated with one of ordinary skill in the art, the filmstrip-type view of the images may represent images on two opposite sides of a street, images on only one side of a street, etc.

While illustrative embodiments have been illustrated and described, it will be appreciated that various changes can be made therein without departing from the spirit and scope of the invention.

The embodiments of the invention in which an exclusive property or privilege is claimed are defined as follows:

1. A configured system comprising:
    at least one database for storing information relating to online stores where items are available online and for storing information relating to offline stores where items are available offline; and
    a computing device having a processor configured to communicate with the at least one database, the computing device being operative to:
        receive a user request from a user for information about an item;
        identify at least one online store where the item is available, the identified at least one online store being identified based on information relating to the user request, and gather first information about the item from one or more of the identified at least one online stores;
        identify at least one offline store where the item is available, the identified at least one offline stores being distinct from the identified at least one online stores;
        in response to the received user request, contact one or more of the identified at least one offline stores to gather second information about the item at the one or more identified offline stores, the contacting including using electronic communications to perform interactions with human representatives at the one or more identified offline stores and to obtain the second information from the interactions; and
        initiate a display of the gathered first and second information to the user.

2. The computer system of claim 1 wherein the information relating to the user request includes location information, and wherein the identifying of the at least one offline store is based at least in part on the included location information.

3. The computer system of claim 1 wherein the information relating to the user request includes price range information, and wherein the interactions with the human representatives includes requesting price information for the item at the one or more identified offline stores.

4. The computer system of claim 1 wherein the using of the electronic communications to perform the interactions with the human representatives includes contacting the human representatives via telephone and using interactive voice recognition techniques to perform the obtaining of the second information from the interactions.

5. The computer system of claim 1 wherein the identified at least one offline stores include multiple identified offline stores, and wherein the configured computing device is further operative to evaluate the gathered second information to determine a likelihood of selection by the user of each of the multiple identified offline stores.

6. The computer system of claim 5 wherein the display of the gathered first and second information includes displayed information about the multiple identified offline stores in order of the determined likelihoods of selection of the multiple identified offline stores, and wherein the computing device is further operative to:
    receive input from the user to select one of the identified at least one offline stores; and
    enable a purchase of the item by the user from the selected offline store.

7. The computer system of claim 1 wherein the user request further specifies desirable attributes of the item, and wherein the display of the gathered first and second information includes information about the specified desirable attributes of the item for one or more stores from the identified at least one online stores and the identified at least one offline stores.

8. The computer system of claim 7 wherein the computing device further includes an agent component that is configured to, when executed by the processor, perform the interactions with the human representatives, and wherein the obtained second information includes information corresponding to the specified desirable attributes of the item for copies of the item available from the one or more identified offline stores.

9. The computer system of claim 7 wherein the computing device is further operative to, if it is determined that the item having the specified desirable attributes is not available at the one or more identified offline stores, determine an alternative item based on the specified desirable attributes that is available at the one or more identified offline stores.

10. The computer system of claim 9 wherein the computing device is further operative to provide information relating to the alternative item to the user.

11. A system configured to search for price information about an item, the system comprising:
    at least one database for storing information relating to online stores where the item is available online and information relating to offline stores where the item is available offline; and
    a computing device configured to communicate with the at least one database, the configured computing device being operative to:
        receive a user request from a user for information about the item, the user request specifying desirable attributes of the item;
        identify at least one online store where the item is available, the online store being identified based on information relating to the user request, and gather first information about the item from one or more of the identified at least one online stores;
        identify at least one offline store where the item is available and has the specified desirable attributes, the identified at least one offline stores being distinct from the identified at least one online stores, and contact one or more of the identified at least one offline stores to gather second information about the item;
        initiate a display of the gathered first and second information to the user;
        receive input from the user to select one of the identified at least one offline stores; and
        enable a purchase of the item by the user from the selected offline store,
    and wherein the configured computing device includes an agent component that is configured, when executed by a processor of the configured computing device, to perform the gathering of the second information about the item, the gathered second information including information corresponding to the specified desirable attributes from the identified at least one offline stores, and to negotiate with the identified at least one offline stores to meet the specified desirable attributes of the item.

12. A computer-implemented method for obtaining information from offline vendors, the method comprising:
receiving, by a configured computing device, a request from a user for information about an item;
automatically identifying, by the configured computing device, multiple offline vendors related to the item;
in response to the received request, gathering, by the configured computing device, information from the identified offline vendors related to the item; and
initiating, by the configured computing device, display of the gathered information to the user, to enable the user to select a desired one of the multiple offline vendors.

13. The computer-implemented method of claim 12 further comprising:
obtaining, by the configured computing device, information about one or more online vendors related to the item; and
enabling the user to compare the obtained information about the one or more online vendors with the gathered information from the identified offline vendors.

14. The computer-implemented method of claim 12 wherein the gathering of the information by the configured computing device includes contacting human representatives of the identified offline vendors and initiating one or electronic communications to obtain the gathered information from the human representatives.

15. The computer-implemented method of claim 12 wherein the gathering of the information by the configured computing device includes contacting human representatives of the identified offline vendors and obtaining the gathered information from the human representatives via an Interactive Voice Recognition System.

16. The computer-implemented method of claim 12 further comprising:
receiving user input from the user to select one of the identified offline vendors based on the displayed gathered information; and
providing detailed information to the user about the selected one offline vendor, the detailed information including information to enable the user to contact the selected one offline vendor.

17. The computer-implemented method of claim 16 further comprising, if the user completes a purchase of the item, storing purchase history information.

18. The computer-implemented method of claim 16 further comprising:
if the user does not complete a purchase of the item:
receiving additional information relating to the item;
identifying one or more additional offline vendors related to the item based on the additional information;
collecting price information from the one or more additional offline vendors; and
initiating display of the collected price information to the user.

19. The computer-implemented method of claim 12 wherein the received request from the user is a local search request corresponding to one or more geographical locations.

20. The computer-implemented method of claim 19 wherein the local search request is received via a user interface provided by the configured computing device.

21. The computer-implemented method of claim 19 wherein the local search request is received via a triggering event that is automatically triggered.

22. The computer-implemented method of claim 12 further comprising obtaining location information specified by the user, and wherein the location information is used for identifying the multiple offline vendors.

23. A non-transitory computer-accessible medium having computer-executable components encoded thereon that are configured to provide consumer price information for an item available at local stores, the components comprising:
a storage component configured to store a local store database having information about the local stores;
a service provider interface component configured to communicate with service providers which provide information relating to the local stores;
a local information component configured to determine one or more of the local stores for a customer by searching the information provided by the service providers and by searching the local store database; and
an offline store interface component configured to collect information from the determined local stores by performing automated interactions with human representatives at the determined local stores, and to provide the collected information to the customer.

24. The non-transitory computer-accessible medium of claim 23 wherein the local information component is further configured to determine a local geographic area based on location information and to use the determined local geographic area when performing the searching of at least one of the local store database and of the information provided by the service providers.

25. The non-transitory computer-accessible medium of claim 24 wherein the determined local stores are located within the determined local geographic area.

26. The non-transitory computer-accessible medium of claim 24 wherein the location information relates to a location of a purchaser of the item.

27. The non-transitory computer-accessible medium of claim 24 wherein the location information relates to a location of a recipient of the item.

28. The non-transitory computer-accessible medium of claim 24 wherein the service providers which provide information relating to local stores are directory service providers.

29. The non-transitory computer-accessible medium of claim 23 further comprising a purchase processing component configured to enable the customer to select one of the determined local stores for a purchase transaction on the item and to conduct the purchase transaction on behalf of the customer.

30. The non-transitory computer-accessible medium of claim 29 wherein the storage component is further configured to store a purchase history database and a customer profile database, and wherein the purchase processing component is further configured to update the purchase history database with a purchase transaction record that indicates the selected one local store and a date/time of the purchase transaction.

31. The non-transitory computer-accessible medium of claim 23 wherein the automated interactions with the human representatives at the determined local stores include obtaining information about an item and are performed in response to a request from the customer for information about the item.

* * * * *